US012651052B2

(12) United States Patent
Veluthakkal et al.

(10) Patent No.: US 12,651,052 B2
(45) Date of Patent: Jun. 9, 2026

(54) METHOD AND SYSTEM FOR A SECURE PLATFORM DRIVEN ROOT OF TRUST (ROT) FOR INFORMATION HANDLING SYSTEM COMPONENTS

(71) Applicant: Dell Products L.P., Round Rock, TX (US)

(72) Inventors: Sreeram Veluthakkal, Pflugerville, TX (US); Kiran George Vetteth, Leander, TX (US); Murali Krishna Somarouthu, Leander, TX (US); Marshal Frederick Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 300 days.

(21) Appl. No.: 18/304,986

(22) Filed: Apr. 21, 2023

(65) Prior Publication Data

US 2024/0354391 A1      Oct. 24, 2024

(51) Int. Cl.
| | |
|---|---|
| *G06F 21/33* | (2013.01) |
| *G06F 8/65* | (2018.01) |
| *G06F 21/57* | (2013.01) |
| *H04L 9/30* | (2006.01) |
| *H04L 9/32* | (2006.01) |

(52) U.S. Cl.
CPC ............... *G06F 21/33* (2013.01); *G06F 8/65* (2013.01); *G06F 21/572* (2013.01); *H04L 9/3073* (2013.01); *H04L 9/3268* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 2019/0163465 A1* | 5/2019 | Fassino | ................... | G06F 21/64 |
| 2019/0384586 A1* | 12/2019 | Jiang | ........................ | H04L 9/006 |
| 2021/0073003 A1* | 3/2021 | Jacquin | ................... | G06F 21/44 |
| 2021/0367974 A1* | 11/2021 | Ponnuru | ............. | H04L 63/0823 |
| 2023/0152998 A1* | 5/2023 | Cai | ........................ | G06F 3/0629 |
| | | | | 711/154 |

FOREIGN PATENT DOCUMENTS

| | | | | |
|---|---|---|---|---|
| WO | WO-2021119430 A1 * | 6/2021 | ........... | G06F 16/217 |

* cited by examiner

*Primary Examiner* — Benjamin E Lanier
*Assistant Examiner* — Felicia Farrow
(74) *Attorney, Agent, or Firm* — Chamberlain, Hrdlicka, White, Williams & Aughtry; Aly Z. Dossa

(57) ABSTRACT
A method for securely updating a firmware (FW) of a component of an information handling system (IHS) includes: receiving an update package for the component; analyzing the update package to extract at least a manifest and an FW update file associated with the component; making a first determination that the manifest is authenticated; making, based on the first determination, a second determination that a key revocation criterion is met, in which the key revocation criterion specifies that a certificate revocation list (CRL) does not specify an authentication key to be used to authenticate an updated FW of the component; updating, based on the second determination, the FW of the component using the FW update file, in which, after being updated, the component has the updated FW; and initiating notification of a user of the IHS about the updated FW of the component.

19 Claims, 7 Drawing Sheets

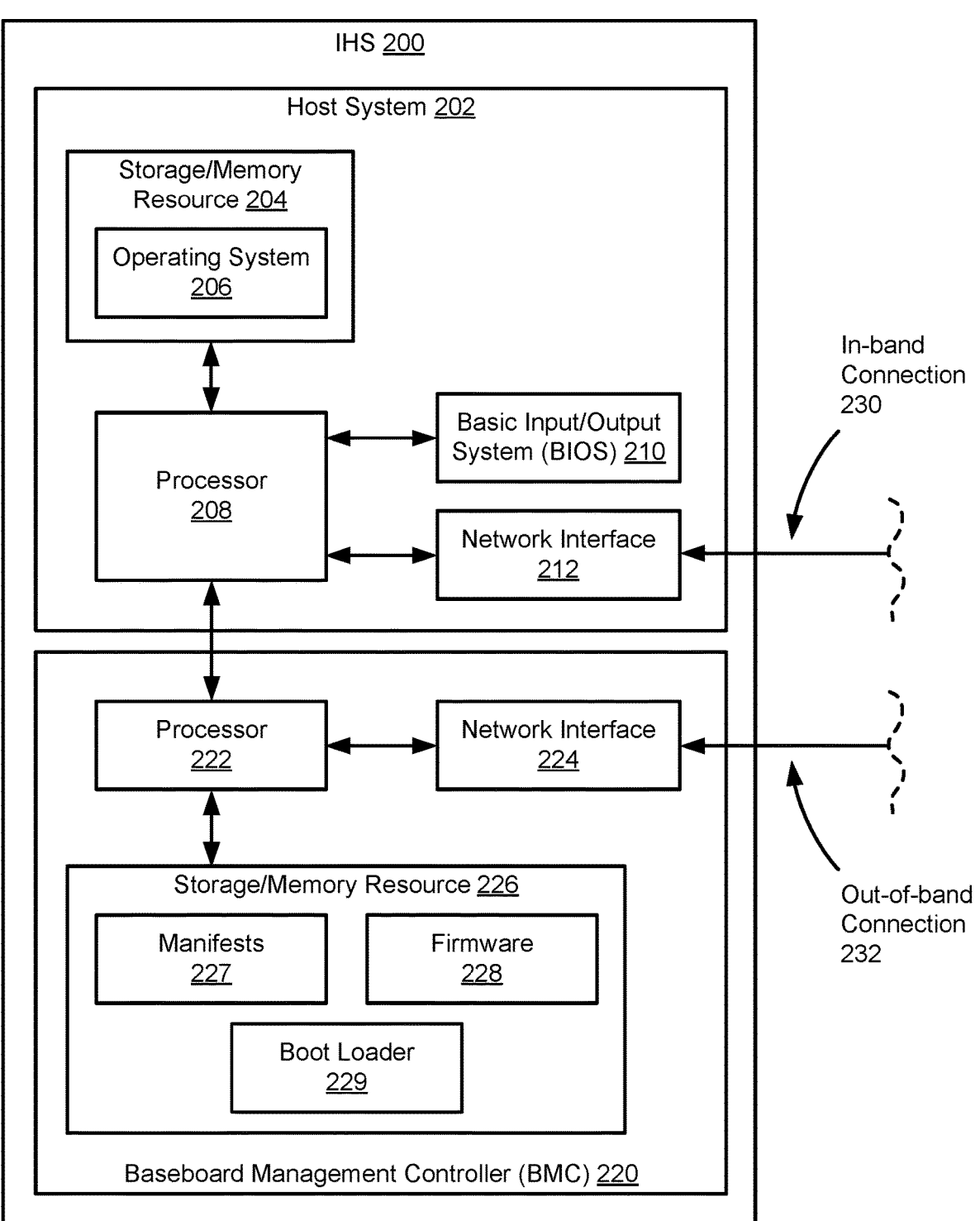
FIG. 2.1

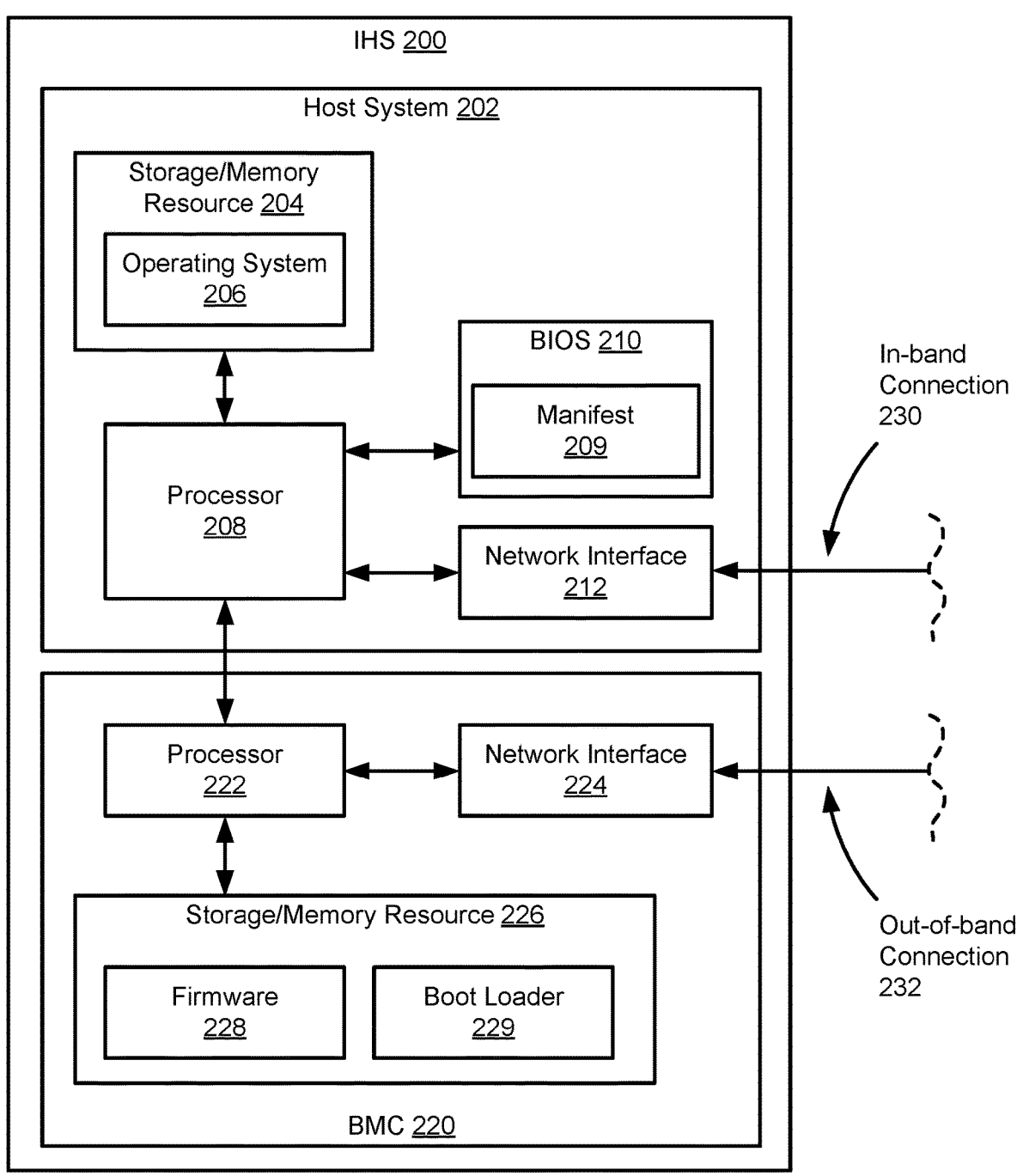
FIG. 2.2

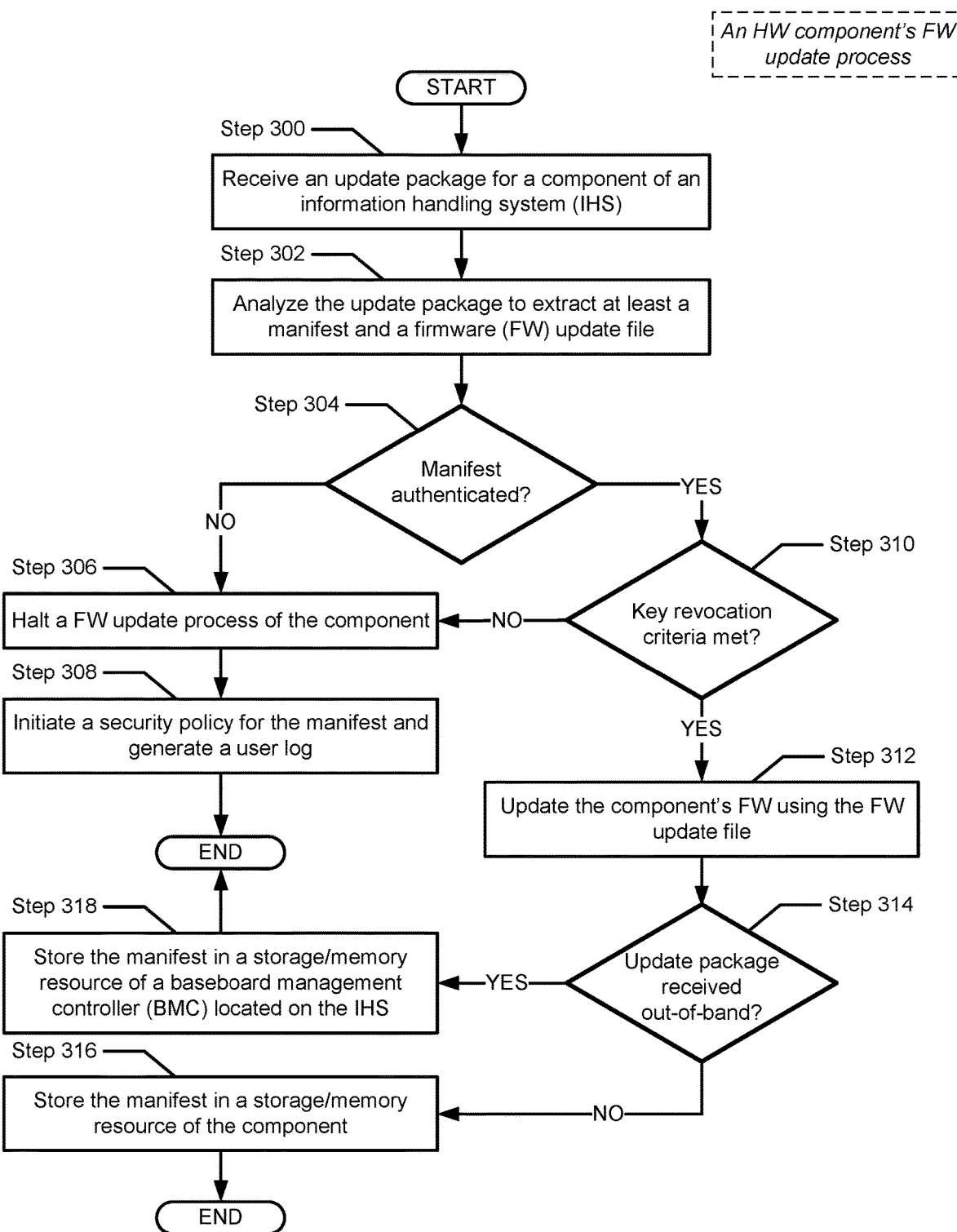
FIG. 3.1

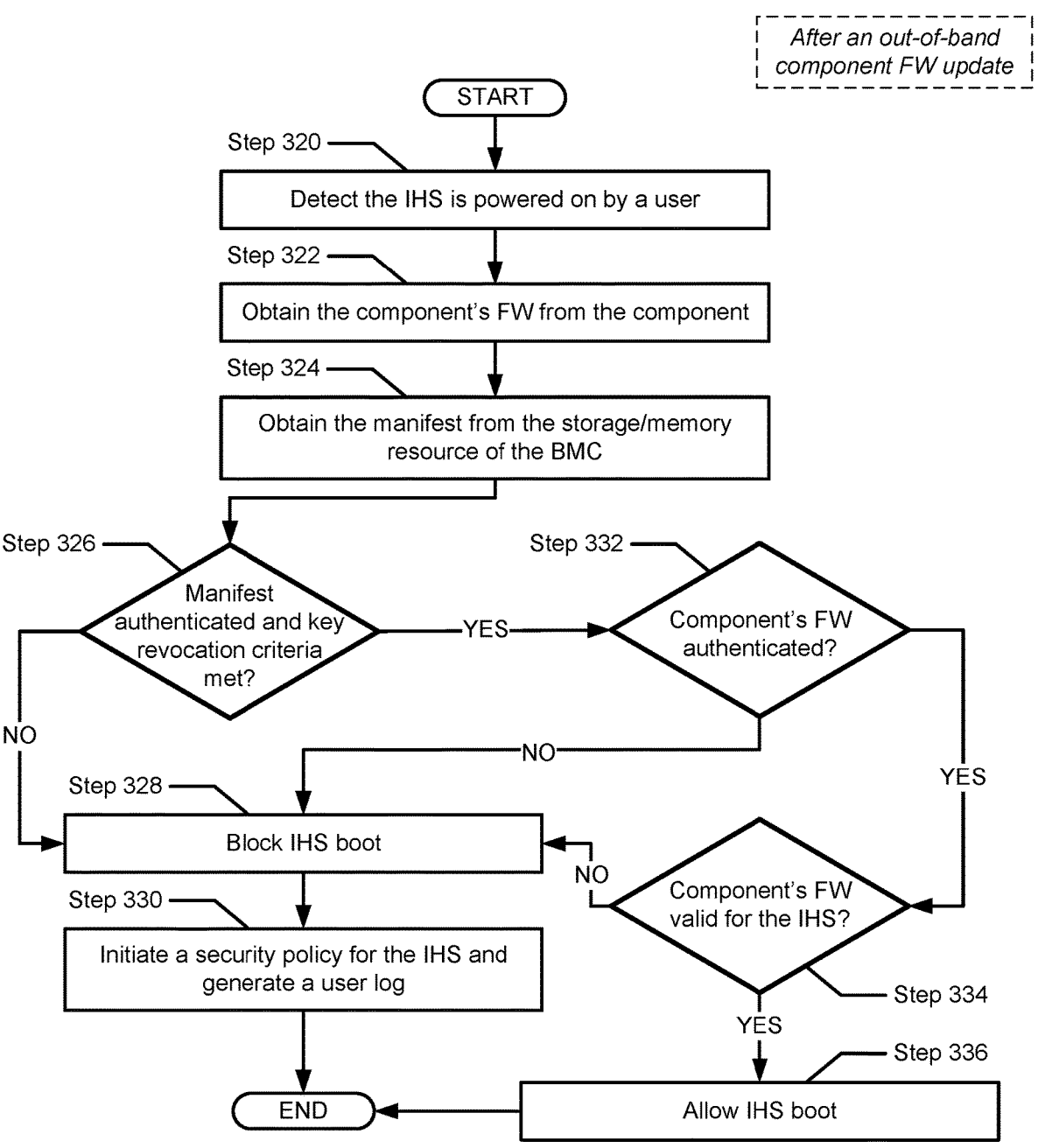
FIG. 3.2

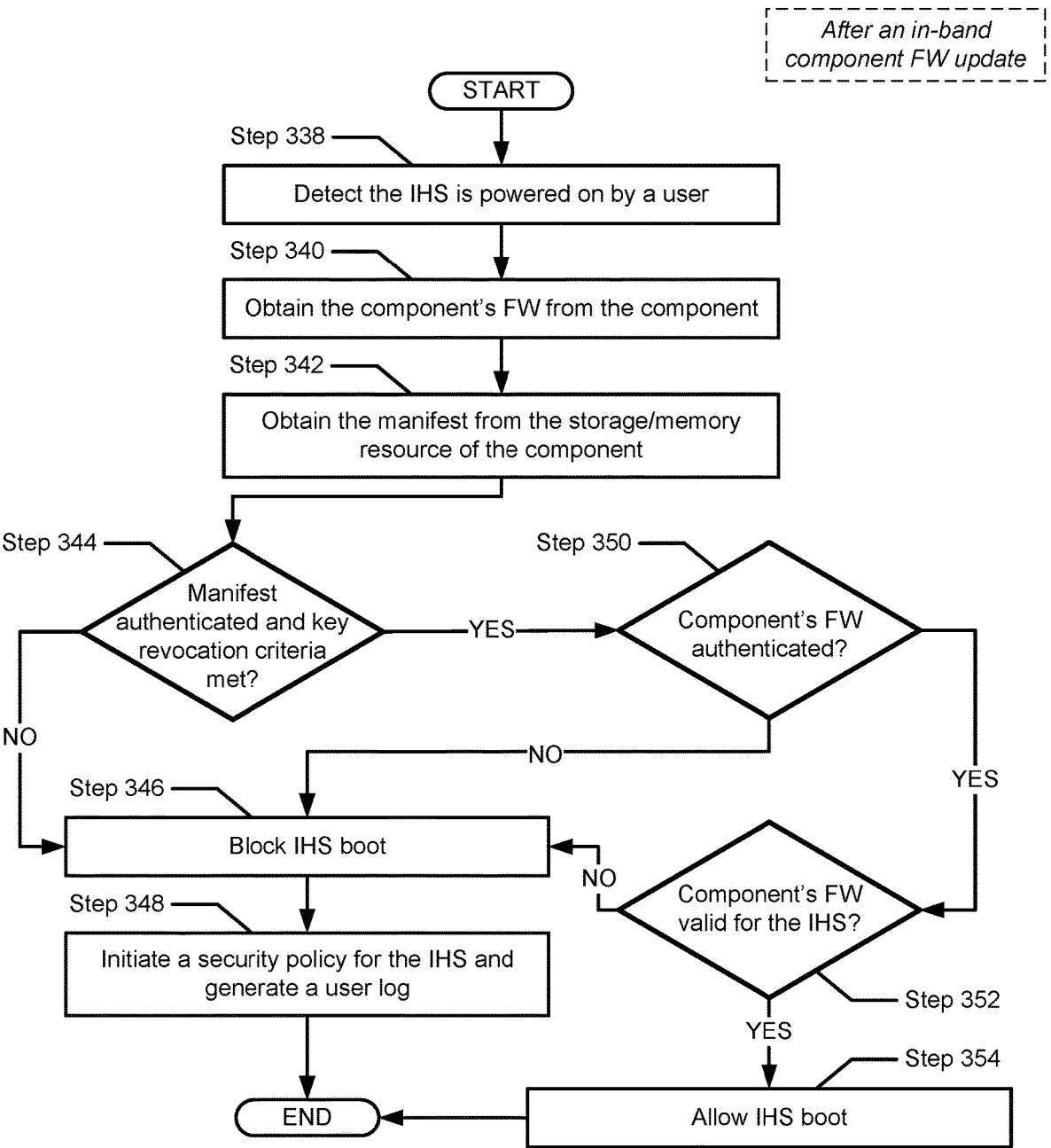

After an in-band component FW update

START

Step 338 — Detect the IHS is powered on by a user

Step 340 — Obtain the component's FW from the component

Step 342 — Obtain the manifest from the storage/memory resource of the component Step 344 — Manifest authenticated and key revocation criteria met?

NO

YES

Step 350 — Component's FW authenticated?

NO

YES

Step 346 — Block IHS boot

NO

Step 352 — Component's FW valid for the IHS?

YES

Step 348 — Initiate a security policy for the IHS and generate a user log

Step 354 — Allow IHS boot

END

METHOD AND SYSTEM FOR A SECURE PLATFORM DRIVEN ROOT OF TRUST (ROT) FOR INFORMATION HANDLING SYSTEM COMPONENTS

BACKGROUND

As the value and use of information continues to increase, individuals and businesses seek additional ways to process and store information. One option available to users (e.g., administrators) is information handling systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow IHSs to be general or configured for a specific user or a specific use such as financial transaction processing, airline ticket reservations, enterprise data storage, or global communications. Further, IHSs may include a variety of hardware and software components that may be configured to process, store, and communicate information and may include one or more computer systems, graphics interface systems, data storage systems, networking systems, and mobile communication systems. IHSs may also implement various virtualized architectures. Data and voice communications among IHSs may be via networks that are wired, wireless, or some combination.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 2.1 shows a diagram of an IHS in accordance with one or more embodiments of the invention.

FIG. 2.2 shows a diagram of an IHS in accordance with one or more embodiments of the invention.

FIG. 3.1 shows a hardware (HW) component's firmware (FW) update process in accordance with one or more embodiments of the invention.

FIG. 3.2 shows an ROT sequence (upon powering on an IHS) after an out-of-band component FW update in accordance with one or more embodiments of the invention.

FIG. 3.3 shows an ROT sequence (upon powering on an IHS) after an in-band component FW update in accordance with one or more embodiments of the invention.

DETAILED DESCRIPTION

Figure 1:
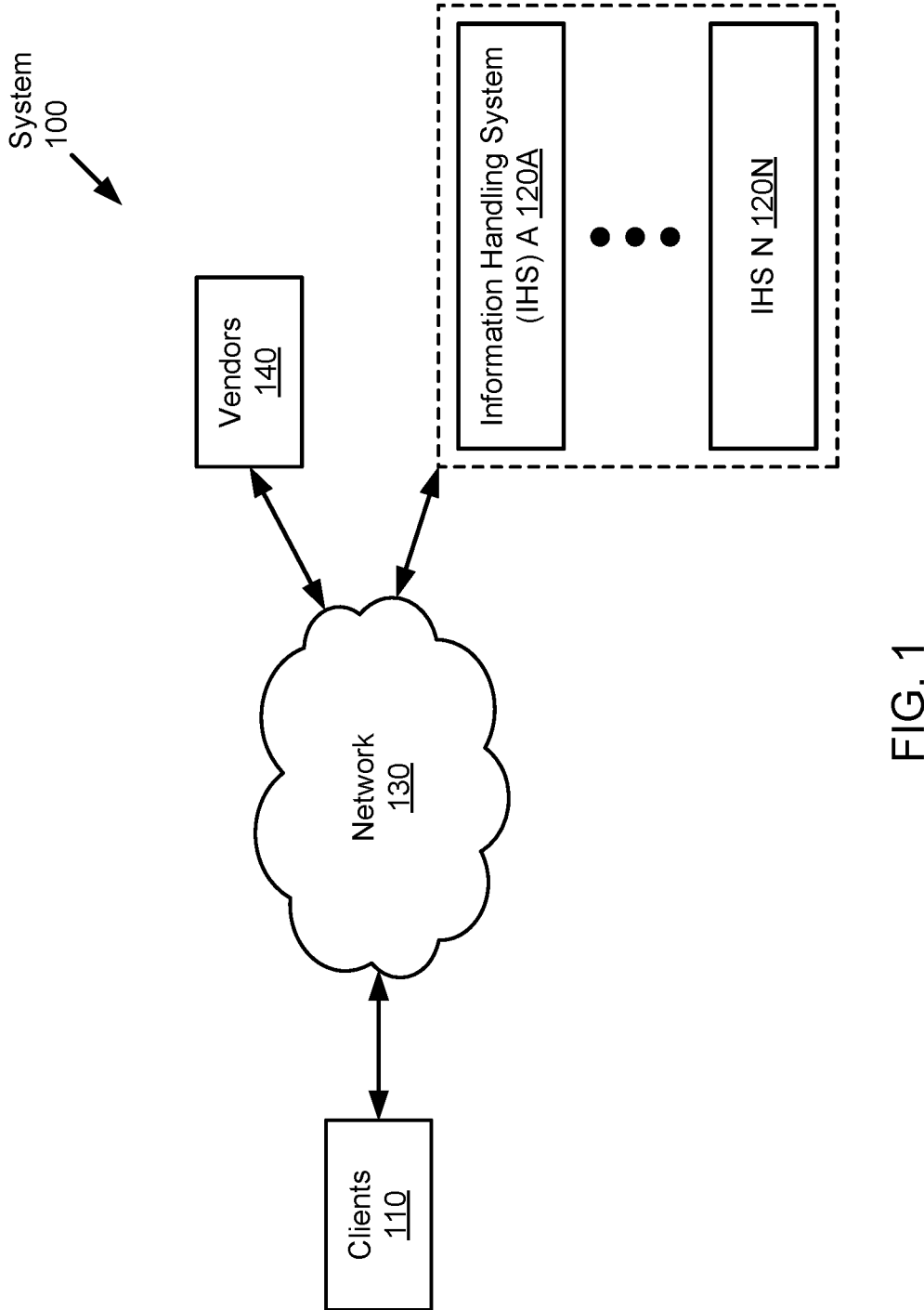
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, for a management controller (e.g., a baseboard management controller (BMC), a dedicated security enclave, etc.) to perform as an ROT on an IHS (e.g., on a platform), the BMC includes a public key (e.g., an authentication key) (for a platform component (e.g., a central processing unit (CPU) (which is critical for the platform to boot up), a network interface card (which is not critical for the platform to boot up), etc.)) in its FW and the BMC uses the public key to authenticate the signature of the platform component's FW (or FW image) based on an asymmetric signature verification mechanism. In newer BMC infrastructures, a manifest is usually used to provide the flexibility of changing a platform component's authentication key with just an FW update to the platform component's FW, while earlier BMC infrastructures would require an FW update to the BMC's FW as well to bring a newer authentication key (in contrast to the authentication key that already exists in the BMC's FW). However, before the platform component's FW is updated, the newer BMC infrastructures may need to send the manifest to the ROT (or the ROT entity) so that the authentication mechanism may work correctly (for example, to be able to use an updated CPU FW, the BMC's FW needs to be updated as well, because (i) the older authentication key for the CPU's FW exists in the BMC's FW and (ii) otherwise the manifest would not be able to authenticate the signature of the updated CPU FW correctly).

In most cases, IHSs provides in-band updates (e.g., updates to be delivered over a shared network or a shared data network) as a feature (from an operating system (OS) or directly from the platform component's FW, e.g., from a unified extensible firmware interface (UEFI) shell to do basic input/output system (BIOS) FW updates) via multiple interfaces (which means the manifest has not reached to the BMC (e.g., the ROT entity)) and because the in-band updates are not initiated from the BMC, the next authentication (or signature verification) process may be failed (because (i) the BMC may not have access to the correct manifest and (b) the BMC may perform the authentication process using an older manifest).

Further, manufacturers (e.g., vendors, trusted third-party vendors, etc.) may not have the ability to disallow or revoke authentication keys in use for one or more platform components and may rely only on disallowing rollbacks (e.g., reverting a version of an authentication key to a previous version). For example, a third-party vendor may have signed a platform component's FW for authentication by the IHS manufacturer (e.g., the main vendor). In order to revoke a compromised authentication key (associated with the component's FW), the third-party vendor has to operate/coordinate with the main vendor so that the main vendor may need to re-spin the BMC FW (which indicates that the third-party vendor is directly dependent to the main vendor). However, an attacker (e.g., a hacker, a malicious user, an intruder, etc.) who has a physical access to the IHS may still be able to program one or more flashes (e.g., flash memory devices) of a platform component with a previously legitimate FW release (but currently revoked) to take advantage of this vulnerability.

Additionally, in modular IHSs (such as data center modular hardware systems (DC-MHSs)), an FW image of a module (e.g., a component) may not be compatible (e.g., may not be in sync) with the modular IHS type (for example, a first module's FW may not be compatible with a second module's FW) because a control module (e.g., the data center-ready secure control module (DC-SCM), the control module that hosts the BMC, etc.) may have been programmed with a generic factory version.

For at least the reasons discussed above, without requiring resource (e.g., time, engineering, etc.) intensive efforts (i) to support all update interfaces (e.g., an in-band component FW update, an out-of-band component FW update, etc.), (ii) to support key revocation (based on, for example, a key revocation list or a certificate revocation list (CRL)), and (iii) to support FW image validity/compatibility checks based on platform type, a fundamentally different approach is needed.

Embodiments of the invention relate to methods and systems (i) to provide mechanisms that supports in-band and/or out-of-band updates, (ii) to provide an additional layer of security against cases that involve authentication key leaks/compromises based on the use of a key revocation list, (iii) to support component FW image validity/compatibility checks before time of use (to ensure that the FW image is not just authenticated) for at least modular architectures/IHSs, and (iv) to notify a user (or an administrator) about an authentication key that is revoked (because of a security risk) or is invalid for the corresponding platform. More specifically, the embodiments of the invention may first receive an update for an HW component (via, for example, an out-of-band connection). The update package may then be analyzed to extract at least a manifest and an FW update file associated with the HW component, in which the FW update file is signed by a vendor for authentication. A first determination may be made as the manifest is authenticated, in which the manifest is signed by the vendor for authentication as well. Based on the first determination, a second determination may be made as a key revocation criterion is met. Based on the second determination, the FW of the HW component may be updated using the FW update file. Thereafter, the manifest may be stored in a memory device of a BMC.

After the corresponding IHS is powered on by a user, the updated FW of the HW component may be obtained. Similarly, the manifest may be obtained from the memory device. A third determination may then be made as the manifest is authenticated and the key revocation criterion is met. Based on the third determination, a fourth determination may be made as the updated FW is authenticated, in which the fourth determination may be made using an authentication key included in the manifest. Based on the fourth determination, a fifth determination may be made as the updated FW is compatible to be executed on the IHS. Finally, based on the fifth determination, the IHS may be booted.

As a result of the processes discussed below, one or more embodiments disclosed herein advantageously ensure that: (i) in-band and/or out-of-band updates are supported, (ii) an additional layer of security against cases that involve authentication key leaks/compromises is provided for more efficient, secure, and reliable IHS operation, (iii) any authentication key related risks/threats that are posed to IHSs (and all the related physical and/or logical components of IHSs) are prevented, (iv) before time of use (of an IHS), a component's FW image is checked with respect to compatibility, and (v) while receiving an in-band and/or out-of-band update, any possible latency is being kept at the minimum level to provide (a) an efficient and reliable, for example, component FW update process, and (b) a better user experience to one or more users of the corresponding IHS.

The following describes various embodiments of the invention.

FIG. 1 shows a diagram of a system (100) in accordance with one or more embodiments of the invention. The system (100) includes any number of clients (110), any number of vendors (140), any number of IHSs (e.g., IHS A (120A), IHS B (120B), etc.), and a network (130). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (110), the vendors (140), and the IHSs (e.g., 120A, 120B, etc.) may be physical or logical devices, as discussed below. While FIG. 1 shows a specific configuration of the system (100), other configurations may be used without departing from the scope of the invention. For example, although the clients (110) and the IHSs (e.g., 120A, 120B, etc.) are shown to be operatively connected through a communication network (e.g., 130), the clients (110) and the IHSs (e.g., 120A, 120B, etc.) may be directly connected. As yet another example, although the vendors (140) and the IHSs (e.g., 120A, 120B, etc.) are shown to be operatively connected through a communication network (e.g., 130), the vendors (140) and the IHSs (e.g., 120A, 120B, etc.) may be directly connected.

Further, the functioning of the clients (110) and the IHSs (e.g., 120A, 120B, etc.) is not dependent upon the functioning and/or existence of the other components (e.g., devices) in the system (100). Rather, the clients (110) and the IHSs (e.g., 120A, 120B, etc.) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver at least computing power, storage capacity, and data protection (e.g., software-defined data protection) as a service to users of the clients (110). The system (100) may also represent a comprehensive middleware layer executing on computing devices (e.g., 400, FIG. 4) that supports virtualized application environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a data center (not shown) may be configured for hosting the IHSs (e.g., 120A, 120B, etc.) and maintaining various workloads, and/or for providing a computing environment (e.g., computing power and storage) whereon workloads may be implemented. In general, a data center's (e.g., a site's, a node's, etc.) infrastructure is based on a network of computing and storage resources that enable the delivery of shared applications and data. For example, the data center of an organization may exchange data with other data centers of the same organization registered in/to the network (130) in order to, for example, participate in a collaborative workload placement. As yet another example, the data center may split up a request (e.g., an operation, a task, an activity, etc.) with another data center, coordinating its efforts to complete the request (e.g., to generate a response) more efficiently than if the data center had been responsible for completing the request. One of ordinary skill will appreciate that the data center may perform other functionalities without departing from the scope of the invention.

In one or more embodiments, the data center may be capable of providing the aforementioned functionalities/ services to the user of the clients (110). However, not all of the users may be allowed to receive all of the services. For example, the priority (e.g., the user access level) of a user may be used to determine how to manage computing resources (e.g., of the IHSs (e.g., 120A, 120B, etc.)) within the data center to provide services to that user. As yet another example, the priority of a user may be used to identify the services that need to be provide to that user. As yet another example, the priority of a user may be used to determine how quickly communications (for the purposes of providing services in cooperation with the network (130) (and its subcomponents)) are to be processed by the network (130).

Further, consider a scenario where a first user is to be treated as a normal user (e.g., a user with a user access level of $4/10$). In such a scenario, the user level of that user may indicate that certain ports (of the subcomponents of the network (130)) are to be opened, other ports are to be blocked so that (i) certain services are to be provided to the user by the data center and (ii) network traffic from that user is to be afforded a normal level of quality (e.g., a normal processing rate). In contrast, a second user may be determined to be a high priority user (e.g., a user with a user access level of $9/10$). In such a case, the user level of that user may indicate that more ports are to be opened than were for the first user so that (i) the data center may provide more services to the second user and (ii) network traffic from that user is to be afforded a high level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, the term "backup" is intended to be broad in scope. In this manner, example backups in connection with which embodiments of the invention may be employed include (but not limited to): full backups, partial backups, clones, snapshots, incremental backups, differential backups, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor of the vendors (140) and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

As used herein, a "container" is an executable unit of software (SW) in which an application code is packaged, along with its libraries and dependencies, so that it can be executed anywhere. To do this, a container takes advantage of a form of OS virtualization in which features of the OS are leveraged to both isolate processes and control the portion of a CPU, memory, and a disk that those processes have access to.

As used herein, a "file system" is a method that an OS (e.g., Microsoft® Windows, Apple® MacOS, etc.) uses to control how data is named, stored, and retrieved. For example, once a user has logged into a computing device (e.g., 400, FIG. 4), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "cloud" refers to servers that are accessed over the Internet (and the SW and databases that executes on those servers). With the help of cloud (or "cloud computing"), users or organizations do not need to manage physical servers themselves or execute SW application on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

In one or more embodiments, an IHS (e.g., 120A, 120B, etc.) may include (i) a chassis configured to house one or more servers (or blades) and their components (see, e.g., FIG. 2.1) and (ii) any instrumentality or aggregate of instrumentalities operable to compute, classify, process, transmit, receive, retrieve, originate, switch, store, display, manifest, detect, record, reproduce, handle, and/or utilize any form of data (e.g., information, intelligence, etc.) for business, management, entertainment, or other purposes. For example, an IHS (e.g., 120A, 120B, etc.) may be a personal computer (e.g., a desktop computer, a laptop computer, a mobile computer, a note-book computer, etc.), a personal digital assistant (PDA), a smart phone, a tablet device (or any other a consumer electronic device), a network storage device, a network server, a switch, a router (or any other network communication device), or any other suitable device, and may vary in size, shape, performance, functionality, and price.

In one or more embodiments, as being a physical computing device or a logical computing device (e.g., a VM), an IHS (e.g., 120A, 120B, etc.) may be configured for, e.g.: (i) hosting and maintaining various workloads, (ii) providing a computing environment (e.g., computing power and storage) whereon workloads may be implemented, (iii) providing computer-implemented services (e.g., receiving a request, sending a response to the request, etc.) to one or more entities (e.g., users, components of the system (100), etc.), (iv) exchanging data with other components registered in/to the network (130) in order to, for example, participate in a collaborative workload placement, and (v) operating as a standalone device. In one or more embodiments, in order to read, write, or store data, an IHS (e.g., 120A, 120B, etc.) may communicate with, for example, a storage array (not shown). One of ordinary skill will appreciate that the IHS may perform other functionalities without departing from the scope of the invention.

Further, while a single IHS is considered above, the term "system" includes any collection of systems or sub-systems that individually or jointly execute a set, or multiple sets, of instructions to provide one or more computer-implemented services. In one or more embodiments, the instructions may embody one or more of the methods or logic in FIGS. 3.1-3.3. In a particular embodiment, the instructions may reside completely, or at least partially, within the storage/memory resource (e.g., 204, FIG. 2.1) or another memory included in the corresponding IHS (e.g., 120A, 120B, etc.), and/or within the processor (e.g., 208, FIG. 2.1) during execution by the IHS (e.g., 120A, 120B, etc.).

An IHS (e.g., 120A, 120B, etc.) may split up a request with another component of the system (100), coordinating its efforts to complete the request (e.g., to generate a response) more efficiently than if the IHS (e.g., 120A, 120B, etc.) had been responsible for completing the request. In one or more embodiments, a request may be, for example (but not limited to): a web browser search request, a representational state transfer (REST) request, a computing request, a database management request, a registration request, a file upload/download request, etc. To provide computer-implemented services to one or more entities, the IHS (e.g., 120A, 120B, etc.) may perform computations locally and/or remotely. By doing so, the IHS (e.g., 120A, 120B, etc.) may utilize different computing devices (e.g., 400, FIG. 4) that have different quantities of computing resources (e.g., processing cycles, memory, storage, etc.) to provide a consistent experience to the entities. In one or more embodiments, the IHS (e.g., 120A, 120B, etc.) may be a heterogeneous set, including different types of HW components and/or different types of OSs.

In one or more embodiments, an IHS (e.g., 120A, 120B, etc.) may host any number of applications (and/or content accessible through the applications) that provide application services to the clients (110). Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in the IHS (e.g., 120A, 120B, etc.). In one or more embodiments, applications may be logical entities executed using computing resources of the IHS (e.g., 120A, 120B, etc.). For example, applications may be implemented as computer instructions, e.g., computer code, stored on persistent storage of the IHS (e.g., 120A, 120B, etc.) that when executed by the processor(s) of the IHS cause the IHS to provide the functionality of the applications described throughout the application.

In one or more embodiments, while performing, for example, one or more operations requested by a user of a client of the clients (110), applications installed on the IHS (e.g., 120A, 120B, etc.) may include functionality to request and use resources (e.g., data, computing resources, etc.) of the IHS (e.g., 120A, 120B, etc.). Applications may also perform other types of functionalities not listed above without departing from the scope of the invention. In one or more embodiments, while providing application services to a user, applications may store (temporarily or permanently) data that may be relevant to the user in the persistent storage of the IHS (e.g., 120A, 120B, etc.).

In one or more embodiments, an IHS (e.g., 120A, 120B, etc.) may provide computer-implemented services to the clients (110) (and/or other components of the system (100)). The IHS (e.g., 120A, 120B, etc.) may provide any quantity and any type of computer-implemented services (e.g., data storage services, electronic communication services, etc.). To provide computer-implemented services, the IHS (e.g., 120A, 120B, etc.) may include a collection of physical components (e.g., processing resources, storage/memory resources, networking resources, etc.) configured to perform operations of the IHS (e.g., 120A, 120B, etc.) and/or otherwise execute a collection of logical components (e.g., virtualization resources) of the IHS (e.g., 120A, 120B, etc.). A portion of the collection of physical and logical components are described below.

In one or more embodiments, an IHS (e.g., 120A, 120B, etc.) may include any number of VMs that host the above-discussed applications. The VMs may be logical entities executed using the physical and logical components of the IHS (e.g., 120A, 120B, etc.), or using computing resources of other computing devices connected to the IHS (e.g., 120A, 120B, etc.). Each of the VMs may perform similar or different processes. In one or more embodiments, the VMs (and applications hosted by the VMs) may generate data (e.g., VM data) that is stored in the persistent storage of the IHS (e.g., 120A, 120B, etc.), in which the VM data may reflect a state of a VM.

In one or more embodiments, VMs may provide services (e.g., application services) to the clients (110). For example, VMs may host instances of databases, email servers, and/or other applications that are accessible to the clients (110). The VMs may host other types of components not listed above without departing from the scope of the invention.

In one or more of embodiments. VMs may be implemented as computer instructions, e.g., computer code, stored in the persistent storage that when executed by the processor(s) of the IHS (e.g., 120A, 120B, etc.) cause the IHS server to provide the functionality of the VMs described throughout the application.

In one or more embodiments, the IHS (e.g., 120A, 120B, etc.) may include a hypervisor. The hypervisor may be configured to orchestrate the operation of the VMs by allocating the physical and logical components to each of the VMs. In one or more embodiments, the hypervisor may be a physical device including circuitry, for example (but not limited to): a field-programmable gate array, an application-specific integrated circuit (ASIC), a programmable processor, a microcontroller, a digital signal processor, etc. The physical device may be adapted to provide the functionality of the hypervisor described throughout the application. Alternatively, similar to the VMs, the hypervisor may also be implemented as computer instructions.

In one or more embodiments, an IHS (e.g., 120A, 120B, etc.) may also include a production agent, which is configured to locally orchestrate the performance of data protection operations. For example, the production agent may perform a data protection operation under the direction of a client, in which the client sends instructions to the production agent regarding: (i) when one or more operations should be performed, (ii) where the resulting data backup(s) should be stored (temporarily or permanently), and (iii) when a VM should be restored to a previous state. Other instructions not listed above may also be sent without departing from the scope of the invention.

In one or more embodiments, to orchestrate the performance of one or more data operations, the production agent may issue commands to the hypervisor to manage one or more VMs when a backup of those VMs is being performed, or when a restoration of those VMs is being performed. In one or more embodiments, the production agent may be implemented using HW, SW, or any combination thereof.

In one or more embodiments, an IHS (e.g., 120A, 120B, etc.) may include functionality to: (i) consolidate multiple data process or protection requests (received from, for example, the clients (110)) so that duplicative operations (which may not be useful for restoration purposes) are not generated, and (ii) initiate multiple data process or protection operations in parallel. For example, the production agent may host multiple operations. Each of the multiple operations may (a) manage the initiation of a respective operation and (b) operate concurrently to initiate multiple operations.

In one or more embodiments, in order to provide the above-mentioned functionalities, an IHS (e.g., 120A, 120B, etc.) may need to communicate with other components of the system (100) with minimum amount of latency (e.g., with high-throughput (e.g., a high data transfer rate) and sub-millisecond latency). For this reason, REST application programming interfaces (REST APIs) may be used to enable communication(s) between the IHS (e.g., 120A, 120B, etc.) and the other components.

As used herein, a "REST API" is an interface that two computing devices use to exchange data securely over the Internet (or to exchange data internally). More specifically, the term "REST" defines a set of rules and constraints (not a protocol or a standard) that need to be followed when building a communication path(s). Any computing device that adheres to those rules and constraints will be able to communicate via a set of uniform, shared, and stateless (or stateful) operators and requests. APIs denote the underlying code that, if it conforms to the set of rules and constraints, allows computing devices to communicate with one another.

In operation, REST APIs use HTTP to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality. As used herein, "HTTP" is a request/response protocol that is used in cases in which a synchronous request/response is required. This means that computing devices making requests via REST APIs must be designed to expect an immediate response. If the client receiving the response is down, the sending service may be blocked while it awaits for the response. To prevent this, failover and error handling logic may be applied to (or built into) both applications.

One of ordinary skill will appreciate that an IHS (e.g., 120A, 120B, etc.) may perform other functionalities without departing from the scope of the invention. In one or more embodiments, the IHS (e.g., 120A, 120B, etc.) may be configured to perform all, or a portion, of the functionalities described in FIGS. 3.1-3.3. Additional details of the IHS are described below in reference to FIGS. 2.1 and 2.2.

Figure 4:
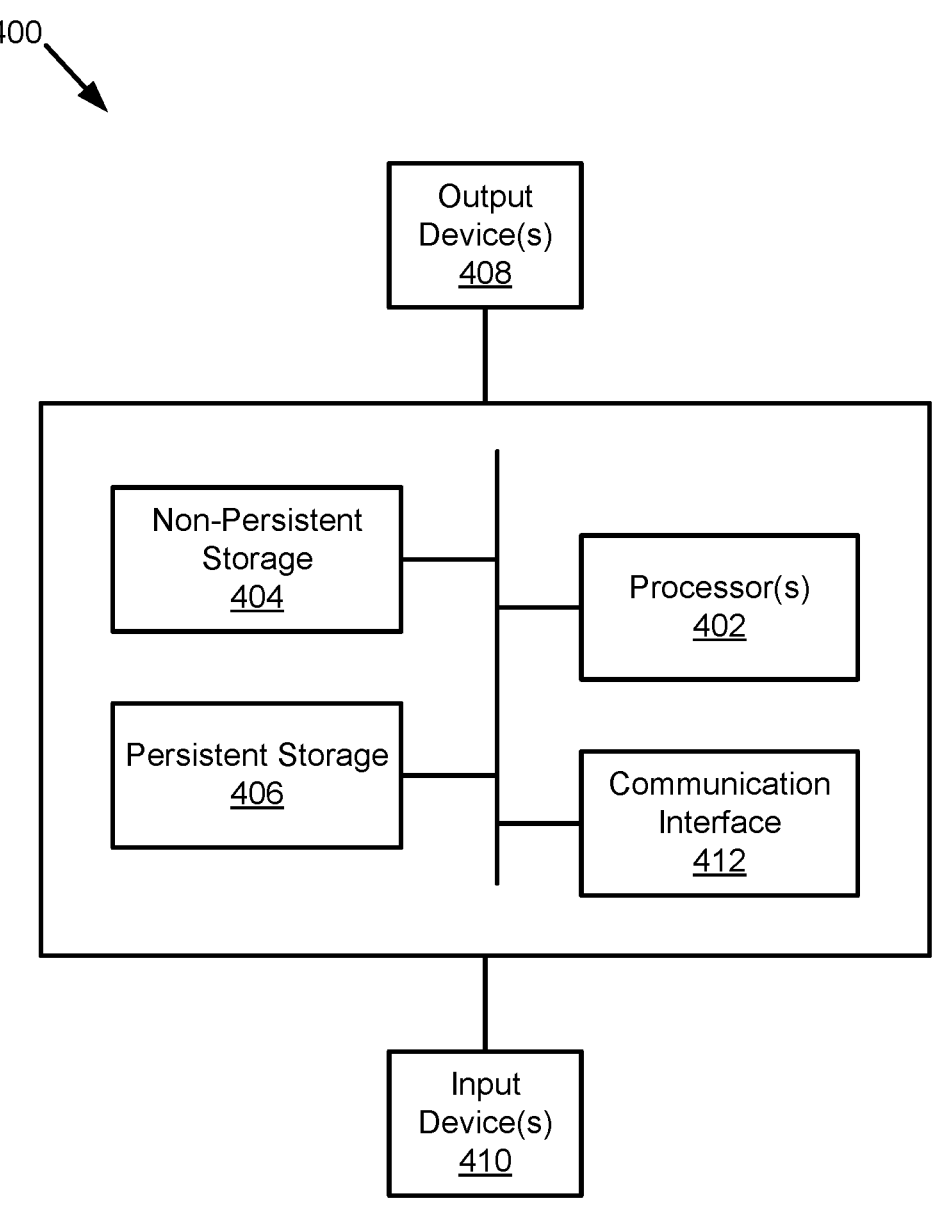
FIG. 4 shows a diagram of a computing device in accordance with one or more embodiments of the invention.

In one or more embodiments, an IHS (e.g., 120A, 120B, etc.) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, SSDs, etc.). The computing device may include instructions, stored in the persistent storage, that when executed by the processor(s) of the computing device cause the computing device to perform the functionality of the IHS (e.g., 120A, 120B, etc.) described throughout this application.

Alternatively, in one or more embodiments, the IHS (e.g., 120A, 120B, etc.) may be implemented as a logical device. The logical device may utilize the computing resources of any number of computing devices to provide the functionality of the IHS (e.g., 120A, 120B, etc.) described throughout this application.

In one or more embodiments, the clients (110) may be physical or logical computing devices configured for hosting one or more workloads, or for providing a computing environment whereon workloads may be implemented. The clients (110) may correspond to computing devices that one or more users use to interact with one or more components of the system (100).

In one or more embodiments, a client may include any number of applications (and/or content accessible through the applications) that provide computer-implemented application services to a user. Applications may be designed and configured to perform one or more functions instantiated by a user of the client. Examples of an application may include (but not limited to): a word processor, a media player, a web browser, a file viewer, an image editor, etc.

In order to provide the above-mentioned application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client. In one or more embodiments, applications may be logical entities executed using computing resources of a client. For example, applications may be implemented as computer instructions, e.g., computer code, stored on persistent storage of the client that when executed by the processor(s) of the client cause the client to provide the functionality of the applications described throughout the application.

In one or more embodiments, while performing, for example, one or more operations requested by a user, applications installed on a client may include functionality to request and use physical and logical components of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of a client.

In one or more embodiments, the clients (110) may interact with the IHSs (e.g., 120A, 120B, etc.). For example, the clients (110) may issue requests to the IHSs (e.g., 120A, 120B, etc.) to receive responses and interact with various components of the IHSs (e.g., 120A, 120B, etc.). The clients (110) may also request data from and/or send data to the IHSs (e.g., 120A, 120B, etc.). As yet another example, the clients (110) may utilize application services provided by the IHSs (e.g., 120A, 120B, etc.). When the clients (110) interact with the IHSs (e.g., 120A, 120B, etc.), data that is relevant to the clients (110) may be stored (temporarily or permanently) in the IHSs (e.g., 120A, 120B, etc.).

As yet another example, consider a scenario in which an IHS (e.g., 120A, 120B, etc.) hosts a database utilized by the clients (110). In this scenario, the database may be a client database associated with users of the clients (110). When a new user is identified, the clients (110) may add information of the new user to the client database. By doing so, data that is relevant to the clients (110) may be stored in the IHS (e.g., 120A, 120B, etc.). This may be done because the clients (110) may desire access to the information of the new user at some point-in-time.

As yet another example, a client of the clients (110) may execute an application that interacts with an application database hosted by an IHS (e.g., 120A, 120B, etc.). When an application upgrade is available to fix a critical SW issue, the IHS (e.g., 120A, 120B, etc.) may identify the client that requires the application upgrade. The application database may then provide the application upgrade to the client. By doing so, the application executed by the client may be kept up-to-date. As yet another example, the clients (110) may send instructions to the IHSs (e.g., 120A, 120B, etc.) to configure one or more VMs hosted by the IHS (e.g., 120A, 120B, etc.). In one or more embodiments, instructions may be, for example (but not limited to): instructions to configure a backup policy, instructions to take a snapshot of VM data, etc.

As yet another example, a client of the clients (110) may initiate an application to execute on an IHSs (e.g., 120A, 120B, etc.) such that the application may (itself) gather, transmit, and/or otherwise manipulate data located in the IHSs (e.g., 120A, 120B, etc.), remote to the client. In one or more embodiments, the clients (110) may share access to more than one IHS and may similarly share any data located in those IHSs.

In one or more embodiments, the clients (110) may provide computer-implemented services to users (and/or other computing devices such as, for example, other clients or other types of components). The clients (110) may provide any quantity and any type of computer-implemented services (e.g., data storage services, electronic communication services, etc.). To provide computer-implemented services, each client may include a collection of physical components (described below) configured to perform operations of the client and/or otherwise execute a collection of logical components (described below) of the client.

In one or more embodiments, a processing resource (not shown) may refer to a measurable quantity of a processing-relevant resource type, which can be requested, allocated, and consumed. A processing-relevant resource type may encompass a physical device (i.e., HW), a logical intelligence (i.e., SW), or a combination thereof, which may provide processing or computing functionality and/or services. Examples of a processing-relevant resource type may include (but not limited to): a CPU, a graphical processing unit (GPU), a data processing unit (DPU), a computation acceleration resource, ASICs, a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, a client may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (110) provide computer-implemented services to users, the clients (110) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (110) may enter into agreements (e.g., SLAs) with providers (e.g., the vendors (140)) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client with external entities (e.g., other clients, the IHSs (e.g., 120A, 120B, etc.), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients. For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual HW component), which can be requested, allocated, and consumed, as a replacement for a physical HW component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

In one or more embodiments, a virtualization resource may include a hypervisor, in which the hypervisor may be configured to orchestrate an operation of, for example, a VM by allocating computing resources of a client to the VM. Details of the hypervisor are described above.

In one or more embodiments, the clients (110) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (110) described throughout the application.

Alternatively, in one or more embodiments, similar to the IHSs (e.g., 120A, 120B, etc. 122), the clients (110) may also be implemented as logical devices.

In one or more embodiments, users may interact with (or operate) the clients (110) in order to perform work-related tasks (e.g., production workloads). In one or more embodiments, the accessibility of users to the clients (110) may depend on a regulation set by an administrator of the clients (110). To this end, each user may have a personalized user account that may, for example, grant access to certain data, applications, and computing resources of the clients (110). This may be realized by implementing the "virtualization" technology (discussed above). In one or more embodiments, an administrator may be a user with permission (e.g., a user that has root-level access) to make changes on the clients (110) that will affect other users of the clients (110).

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in HW (e.g., circuitry), SW, or any combination thereof.

In one or more embodiments, the GUI may be displayed on a display of a computing device (e.g., 400, FIG. 4) using functionalities of a display engine (not shown), in which the display engine is operatively connected to the computing device. The display engine may be implemented using HW. SW, or any combination thereof. The login screen may be displayed in any visual format that would allow the user to easily comprehend (e.g., read and parse) the listed information.

In one or more embodiments, the network (130) may represent a computing network and/or fabric configured for computing resource and/or messages exchange among registered computing devices (e.g., the clients (110), the IHSs (e.g., 120A, 120B, etc.), etc.). As discussed above, components of the system (100) may operatively connect to one another through the network (130) (e.g., a storage area network (SAN), a personal area network (PAN), a local area network (LAN), a metropolitan area network (MAN), a wide area network (WAN), a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network (130) may be operably connected to the Internet or other networks. Further, the network (130) may enable interactions between, for example, the clients (110) and the IHSs (e.g., 120A, 120B, etc.) through any number and type of wired and/or wireless network protocols (e.g., TCP, UDP, Internet Protocol version 4 (IPv4), etc.). Further, the network (130) may be configured to perform all, or a portion, of the functionality described in FIGS. 3.1-3.3.

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network (130), and (iii) limiting communication(s) on a granular level (e.g., on a per-port level, on a per-sending device level, etc.). The network (130) and its subcomponents may be implemented using HW, SW, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of milliseconds or less) network traffic and non-real-time network traffic should be managed in the network (130). In one or more embodiments, the real-time network traffic may be high priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

In one or more embodiments, the non-real-time network traffic may be low priority (e.g., non-urgent) network traffic. For this reason, data packets of the non-real-time network traffic may not need to be prioritized in the network (130). The non-real-time network traffic may include data packets related to, for example (but not limited to): File Transfer Protocol (FTP) for web publishing, email applications, etc.

In one or more embodiments, the vendors (140) may refer to any party such as the manufacturers, distributors (e.g., to a user of a client), or vendors of an IHS (e.g., 120A, 120B, etc.). A vendor of the vendors (140) may include functionality to, e.g.: (i) using a private key, sign (or otherwise secure) a manifest (e.g., 209, FIG. 2.2) for authentication so that, for example, a signature for the manifest is generated, (ii) using a private key, sign an FW update file associated with an HW component (of an IHS (e.g., 120A, 120B, etc.)) for authentication (via, for example, a public key that is paired with the private key) so that, for example, a signature for the FW update file is generated, (iii) provide an FW stack (e.g., an integrated Dell remote access controller (iDRAC®) provided by Dell) to an IHS (e.g., 120A, 120B, etc.), (iv) develop and/or deploy standard BMC FW stacks to a BMC (e.g., 220, FIG. 2.2), (v) sign and release BMC code (e.g., BMC FW, a boot loader (e.g., 229, FIG. 2.1)), (vi) update a CRL, (vii) by employing an asymmetric key encryption model (for example, via its cryptographic processor), generate a public key (e.g., an authentication key) and a private key (which are key pairs) per HW component's FW (or FW stack) before shipping the corresponding IHS (e.g., 120A, 120B, etc.) to a user, (viii) sign all of the SW (e.g., a user's kernel, a user application, etc.) within the IHS (e.g., 120A, 120B, etc.), and (ix) keep/store the private key (generated in (vii)) in a security vault (e.g., a high security module) external to the IHSs (e.g., 120A, 120B, etc.) and ship the authentication key (generated in (vii)) within the corresponding IHS (e.g., 120A, 120B, etc.). In this manner, for example, a user may ensure that FW and SW executing on the corresponding IHS (e.g., 120A, 120B, etc.) are the FW and SW that the user intended to load and execute on the IHS (e.g., 120A, 120B, etc.).

As used herein, the term "management controller" may broadly refer to a system that provides management functionality (typically out-of-band management functionality) to one or more IHSs (e.g., e.g., 120A, 120B, etc.). In one or more embodiments, a management controller may be (or may be an integral part of) a service processor, a BMC, a chassis management controller (CMC), or a remote access controller (e.g., a Dell remote access controller (DRAC®) or an iDRAC®).

One of ordinary skill will appreciate that the vendors (140) may perform other functionalities without departing from the scope of the invention. Each vendor of the vendors (140) may include an agent (not shown) that performs the aforementioned functionalities. The agent may be implemented using HW. SW, or any combination thereof.

Turning now to FIG. 2.1, FIG. 2.1 shows a diagram of an IHS (200) in accordance with one or more embodiments of the invention. The IHS (200) may be an example of an IHS discussed above in reference to FIG. 1. The IHS (200) may include (i) a host system (202) that hosts a storage/memory resource (204), a processor (208), a BIOS (210) (e.g., a UEFI BIOS), and a network interface (212); and (ii) a BMC (220) that hosts a storage/memory resource (226), a processor (222), and a network interface (224). The IHS (200) may include additional, fewer, and/or different components without departing from the scope of the invention. Each component may be operably connected to any of the other component via any combination of wired and/or wireless connections. Each component illustrated in FIG. 2.1 is discussed below.

In one or more embodiments, the IHS (200) may include a frame (not shown) and any number of chassis (not shown). The frame may be a mechanical structure that enables chassis to be positioned with respect to one another. For example, the frame may be a rack mount enclosure that enables chassis to be disposed within it. The frame may be implemented as other types of structures adapted to house, position, orient, and/or otherwise physically, mechanically, electrically, and/or thermally manage chassis. By managing the chassis, the frame may enable multiple chassis to be co-located.

In one or more embodiments, a chassis may be a mechanical structure for housing at least the aforementioned components of the IHS (200). For example, a chassis may be implemented as a rack mountable enclosure for housing the aforementioned components of the IHS (200). The chassis may be adapted to be disposed within the frame.

In one or more embodiments, the processor (208) may be communicatively coupled to the storage/memory resource (204), the BIOS (210), the network interface (212), and the processor (222) via any suitable interface, for example, a system interconnect including one or more system buses (operable to transmit communication between various HW components) and/or peripheral component interconnect express (PCIe) bus/interface. In one or more embodiments, the processor (208) may be configured for executing machine-executable code like a CPU, a programmable logic array (PLA), an embedded device such as a System-on-a-Chip (SoC), or HW/SW control logic.

More specifically, the processor (208) may include any system, device, or apparatus configured to interpret and/or execute program instructions and/or process data, and may include, without limitation, a microprocessor, a microcontroller, a digital signal processor (DSP), an ASIC, or any other digital or analog circuitry configured to interpret and/or execute program instructions and/or process data. In one or more embodiments, the processor (208) may interpret and/or execute program instructions and/or process data stored in the storage/memory resource (204) and/or another component of IHS (200).

One of ordinary skill will appreciate that the processor (208) may perform other functionalities without departing from the scope of the invention. When providing its functionalities, the processor (208) may perform all, or a portion, of the methods illustrated in FIGS. 3.1 and 3.3. The processor (208) may be implemented using HW, SW, or any combination thereof.

In one or more embodiments, when two or more components are referred to as "coupled" to one another, such term indicates that such two or more components are in electronic communication or mechanical communication, as applicable, whether connected directly or indirectly, with or without intervening components.

In one or more embodiments, the storage/memory resource (204) may have or provide at least the functionalities and/or characteristics of the storage or memory resources described above in reference to FIG. 1. The storage/memory resource (204) may include any instrumentality or aggregation of instrumentalities that may retain data (e.g., operating system (206) data, tamper-protected data, application data, etc.), program instructions, applications, and/or FW (temporarily or permanently). In one or more embodiments, SW and/or FW stored within the storage/memory resource (204) may be loaded into the processor (208) and executed during operation of the IHS (200).

Further, the storage/memory resource (204) may include, without limitation, (i) storage media such as a direct access storage device (e.g., an HDD or a floppy disk), a sequential access storage device (e.g., a tape disk drive), compact disk, CD-ROM, DVD, RAM, read-only memory (ROM), electrically erasable programmable read-only memory (EEPROM), magnetic storage, opto-magnetic storage, and/or volatile or non-volatile memory (e.g., flash memory) that retains data after power to the IHS (200) is turned off; (ii) communications media such as wires, optical fibers, microwaves, radio waves, and other electromagnetic and/or optical carriers; and/or any combination of thereof.

Although the storage/memory resource (204) is depicted as integral to the host system (202), in some embodiments, all or a portion of the storage/memory resource (204) may reside external to the host system (202).

In one or more embodiments, the operating system (206) may include any program of executable instructions (or aggregation of programs of executable instructions) configured to manage and/or control the allocation and usage of HW resources such as memory, processor time, disk space, and input/output devices, and provide an interface between such HW resources and applications hosted by the operating system (206). Further, the operating system (206) may include all or a portion of a network stack for network communication via a network interface (e.g., the network interface (212) for communication over a data network (e.g., an in-band connection (230))).

In one or more embodiments, active portions of the operating system (206) may be transferred to the storage/memory resource (204) for execution by the processor (208). Although the operating system (206) is shown in FIG. 2.1 as stored in the storage/memory resource (204), in some embodiments, the operating system (206) may be stored in external storage media accessible to the processor (208), and active portions of the operating system (206) may be transferred from such external storage media to the storage/memory resource (204) for execution by the processor (208).

In one or more embodiments, the FW stored in the storage/memory resource (204) may include power profile data and thermal profile data for certain HW devices (e.g., the processor (208), the BIOS (210), the network interface (212), input/output ("I/O") controllers (described below), etc.). Further, the storage/memory resource (204) may include a UEFI interface (not shown) for accessing the BIOS (210) as well as updating the BIOS (210). In most cases, the UEFI interface may provide an SW interface between the operating system (206) and the BIOS (210), and may support remote diagnostics and repair of HW devices, even with no OS is installed.

In one or more embodiments, the I/O controllers (not shown) may manage the operation(s) of one or more I/O device(s) (connected/coupled to the IHS (200)), for example (but not limited to): a keyboard, a mouse, a touch screen, a microphone, a monitor or a display device, a camera, an optical reader, a USB, a card reader, a personal computer memory card international association (PCMCIA) slot, a high-definition multimedia interface (HDMI), etc.

One of ordinary skill will appreciate that the storage/memory resource (204) may perform other functionalities without departing from the scope of the invention. When providing its functionalities, the storage/memory resource (204) may perform all, or a portion, of the methods illustrated in FIGS. 3.1-3.3. The storage/memory resource (204) may be implemented using HW, SW, or any combination thereof.

In one or more embodiments, the BIOS (210) may refer to any system, device, or apparatus configured to (i) identify, test, and/or initialize information handling resources (e.g., the network interface (212), other HW components of the IHS (200), etc.) of the IHS (200) (typically during boot up or power on of the IHS (200)), and/or initialize interoperation of the IHS (200) with other IHSs, and (ii) load a boot loader or an OS (e.g., the operating system (206) from a mass storage device). The BIOS (210) may be implemented as a program of instructions (e.g., FW, a FW image, etc.) that may be read by and executed on the processor (208) to perform the functionalities of the BIOS (210).

In one or more embodiments, the BIOS (210) may include boot FW configured to be the first code executed by the processor (208) when the IHS (200) is booted and/or powered on. As part of its initialization functionality, the boot FW may be configured to set HW components of the IHS (200) into a known state, so that one or more applications (e.g., the operating system (206) or other applications) stored on the storage/memory resource (204) may be executed by the processor (208) to provide computer-implemented services to one or more users of the clients (e.g., 110, FIG. 1). Further, the BIOS (210) may provide an abstraction layer for some of the HW components of the IHS (200), such as a consistent way for applications and OSs to interact with a keyboard, a display, and other I/O components.

One of ordinary skill will appreciate that the BIOS (210) may perform other functionalities without departing from the scope of the invention. When providing its functionalities, the BIOS (210) may perform all, or a portion, of the methods illustrated in FIGS. 3.1-3.3. The BIOS (210) may be implemented using HW, SW, or any combination thereof.

In one or more embodiments, as being an in-band network interface, the network interface (212) may include one or more systems, apparatuses, or devices that enable the host system (202) to communicate and/or interface with other devices (including other host systems), services, and components that are located externally to the IHS (200). These devices, services, and components, such as a system management module (not shown), may interface with the host system (202) via an external network (e.g., a shared network, a data network, an in-band network, etc.), such as the in-band connection (230) (that provides in-band access), which may include a LAN, a WAN, a PAN, the Internet, etc.

In one or more embodiments, the network interface (212) may enable the host system (202) to communicate using any suitable transmission protocol and/or standard. The network interface (212) may include, for example (but not limited to): a network interface card, a 20 gigabit Ethernet network interface, etc. In one or more embodiments, the network interface (212) may be enabled as a LAN-on-motherboard (LOM) card.

One of ordinary skill will appreciate that the network interface (212) may perform other functionalities without departing from the scope of the invention. When providing its functionalities, the network interface (212) may perform all, or a portion, of the methods illustrated in FIGS. 3.1-3.3. The network interface (212) may be implemented using HW, SW, or any combination thereof.

In one or more embodiments, as being a specialized processing unit (if, for example, the IHS (200) is a server) or an embedded controller (if, for example, IHS (200) is a user-level device) different form a CPU (e.g., the processor (208)), the BMC (220) may be configured to provide management/monitoring functionalities (e.g., power management, cooling management, etc.) for the management of the IHS (200) (e.g., the HW components and FW in the IHS (200), such as the BIOS FW, the UEFI FW, etc.). Such management may be made even if the IHS (200) is powered off or powered down to a standby state. The BMC (220) may also (i) determine when one or more computing components are powered up, (ii) be programmed using a FW stack (e.g., an iDRAC® FW stack) that configures the BMC (220) for performing out-of-band (e.g., external to the BIOS (210)) HW management tasks, and (iii) collectively provide a system for monitoring the operations of the IHS (200) as well as controlling certain aspects of the IHS (200) for ensuring its proper operation.

In one or more embodiments, the BMC (220) may include (or may be an integral part of), for example (but not limited to): a CMC, a remote access controller (e.g., a DRAC® or a iDRACR), etc. The BMC (220) may be accessed by an administrator of the IHS (220) via a dedicated network connection (i.e., the out-of-band connection (232)) or a shared network connection (i.e., the in-band connection (230)).

In one or more embodiments, the processor (222) may be communicatively coupled to the storage/memory resource (226), the network interface (224), and the processor (208) via any suitable interface, for example, a system interconnect including one or more system buses (operable to transmit communication between various HW components) and/or PCIe bus/interface. In one or more embodiments, the processor (222) may be configured for executing machine-executable code like a CPU, a PLA, an embedded device such as a SoC, or HW/SW control logic.

More specifically, the processor (222) may include any system, device, or apparatus configured to interpret and/or execute program instructions and/or process data, and may include, without limitation, a microprocessor, a microcontroller, a DSP, an ASIC, or any other digital or analog circuitry configured to interpret and/or execute program instructions and/or process data. In one or more embodiments, the processor (222) may interpret and/or execute program instructions and/or process data stored in the storage/memory resource (226) and/or another component of IHS (200). For example, the processor (222) may execute a standard BMC FW stack (e.g., the firmware (228), an iDRAC® FW stack, etc.) or a custom BMC FW stack (e.g., the one deployed by a user of the IHS (200)) that is stored in the storage/memory resource (226). The processor (222) may also provide an interface between management SW (available in the storage/memory resource (226)) and HW components of the host system (202).

In one or more embodiments, either BMC FW stack may provide out-of-band monitoring and management of the HW components of the IHS (200). Examples of monitoring functions that the BMC FW stack may provide include, but not limited to, monitoring internal ambient temperatures and/or voltages in the IHS (200), along with monitoring the processor (208), the storage/memory resource (204), and network usage levels, and the like. Examples of management features may include installation of SW including the base OS (of the IHS (200)), managing operation of one or more environmental control components in the IHS (200), turning certain HW components of the IHS (200) on or off, and the like.

In one or more embodiments, the processor (222) may be the same type of device as the processor (208), or in other embodiments, the processor (222) may be a device of a different type.

One of ordinary skill will appreciate that the processor (222) may perform other functionalities without departing from the scope of the invention. When providing its functionalities, the processor (222) may perform all, or a portion, of the methods illustrated in FIGS. 3.1 and 3.2. The processor (222) may be implemented using HW, SW, or any combination thereof.

In one or more embodiments, the storage/memory resource (226) may have or provide at least the functionalities and/or characteristics of the storage or memory resources described above in reference to FIG. 1. The storage/memory resource (226) may include any instrumentality or aggregation of instrumentalities that may retain data (e.g., one or more manifests (227), tamper-protected data, etc.), program instructions, applications, a boot loader (229), an immutable attribute, the firmware (228), and/or FW backup image (temporarily or permanently). In one or more embodiments, SW and/or the firmware (228) stored within the storage/memory resource (226) may be loaded into the processor (222) and executed during operation of the IHS (200).

Further, the storage/memory resource (226) may include, without limitation, (i) storage media such as a direct access storage device (e.g., an HDD or a floppy disk), a sequential access storage device (e.g., a tape disk drive), compact disk, CD-ROM, DVD, RAM, ROM, EEPROM, magnetic storage, opto-magnetic storage, and/or volatile or non-volatile memory (e.g., flash memory) that retains data after power to the IHS (200) is turned off; (ii) communications media such as wires, optical fibers, microwaves, radio waves, and other electromagnetic and/or optical carriers; and/or any combination of thereof.

In one or more embodiments, the firmware (228) may include any program of executable instructions, or aggregation of programs of executable instructions, configured to, when executed, provide control, monitoring, and/or data manipulation of HW components of the BMC (220) in order to perform the functionalities of the BMC (220). The firmware (228) may be provided and signed by a vendor of the vendors (e.g., 140, FIG. 1) of the IHS (200). Although the firmware (228) is shown as stored in the storage/memory resource (226), in one or more embodiments, the firmware (228) may be stored in storage media accessible to the processor (222), and active portions of the firmware (228) may be transferred from such storage media to the storage/memory resource (226) for execution by the processor (222).

In one or more embodiments, the FW backup image may be a program of executable instructions, or aggregation of programs of executable instructions, that serve as a backup to the firmware (228) in the event the firmware (228) becomes corrupted. In one or more embodiments, the FW backup image may be maintained as a copy of the firmware (228). Separately, the FW backup image may include a "last known good" image that embodies the most recent version of the firmware (228) known to have executed without corruption.

In one or more embodiments, the immutable attribute (or the "immutable code") may be any attribute that may not be spoofed or otherwise manipulated after, for example, the storage/memory resource (226) is initially bond to the BMC (220) during the factory process of the IHS (220). The immutable attribute may not be changed over the lifetime of the BMC (220) and may form the core ROT to be able to (i) verify/authenticate, for example, a manifest, an HW component's FW, and the like, and (ii) generate a chain of trust by performing signature verification operations (before, for example, booting the IHS (200)).

For example, the immutable attribute may be any identifier associated with the BMC (220) including, but not limited to, a media access control (MAC) address of the BMC (220). The MAC address may be fused to the BMC (220), in which the MAC address may be encrypted via any suitable operation including, but not limited to, a hidden root key operation. The hidden root key operation may be performed any suitable HW circuitry within the BMC (220) including, but not limited to, a cryptography engine of the BMC (220).

In one or more embodiments, a manifest (e.g., metadata of an HW component of the IHS (200) to be able to verify/ authenticate that HW component) may be an extensible markup language (XML) file that may include (or specify), for example (but not limited to): a protocol to be used to communicate with an HW component (e.g., the BIOS (210), the network interface (212), etc.), location information of an HW component within the IHS (200) (so that the storage/ memory resource of that HW component may be accessed easily), a number of HW components considered in the manifest, a public key (e.g., an authentication key) to perform signature verification (in which the public key will not be included in the firmware (228)), a CRL, a model number and/or a type of a supported IHS, etc.

As shown in FIG. 2.1, (i) each manifest of the HW components (collectively referred as "the manifests (227)", for example, if the BMC (220) is supporting 10 different HW components, the manifests (227) may include 10 different manifests related to those HW components) is stored separately from the firmware (228) and (ii) the manifests (227) are stored within the storage/memory resource (226) of the BMC (220). Said another way, the manifests (227) are stored in a location that is internal to the BMC (220). In another embodiment of the invention, a manifest (209) may be stored in a location that is external to the BMC (220). As shown in FIG. 2.2, the manifest (209) may be stored in the corresponding HW component (e.g., the BIOS (210)).

In one or more embodiments, a CRL (or a key revocation list) may specify (or include), for example (but not limited to): all the authentication keys that are invalid for authentication (for example, of the corresponding HW component's FW), a number of authentication keys that have been revoked previously, an identifier of an authentication key that has been revoked previously, etc. In one or more embodiments, "a CRL in the manifest" may act as a guard against any key rollback attacks (e.g., may provide additional security against cases that involve key leaks/compromises, may provide a quick solution for the aforementioned cases, etc.). For example, even if a malicious actor is trying to manipulate/boot up the storage/memory resource (204) offline, the corresponding manifest of the storage/memory resource (204) may indicate that the authentication key (used by the malicious actor) has been revoked. Based on this, the BMC (220) will not allow the corresponding FW of the storage/memory resource (204) to boot.

As yet another example, if there is an authentication key leak issue, the corresponding vendor (of the HW component) may not need to wait for the manufacturer of the BMC (220) to provide a different FW for the BMC (220). The vendor (of the HW component) may directly update the corresponding CRL (for the HW component's FW) and re-spin the HW component's FW. In this manner, the vendor may directly and quickly react to the issue and the IHS (200) may be protected from any downgrade attacks.

As yet another example (partly related to Step 310 of FIG. 3.1), consider a scenario where an HW component manufacturer wants to revoke an authentication key (e.g., Key A) used for the HW component's FW with another authentication key (e.g., Key B) (because the current FW of the HW component was found as compromised). For this reason, the manufacturer generates (i) another FW (e.g., a newer FW) for the HW component that is signed with a private key pair of Key B, and (ii) an updated manifest that includes at least (a) Key B (because Key B will be used for authentication) and (b) a CRL that lists Key A as the revoked key. The manufacturer may then send an update package (including the updated manifest and the newer FW (e.g., the FW update file) for the HW component) to the IHS (200) via the in-band connection (230) or the out-of-band connection (232).

Upon receiving the update package and in order to update the HW component's FW with the newer FW, the BMC (220) may, e.g.: (i) check the authenticity of the updated manifest (or the "ingress manifest") by performing a signature verification via a manifest authentication key (e.g., Key M) stored in the firmware (228); (ii) based on (i), fail the update process or proceed to (iii); (iii) check the updated manifest does not use an HW component's FW authentication key that is listed in the CRL; (iv) based on (iii), fail the update process or proceed to (v); (v) verify/validate the CRL based on a X509 CRL validity standard to make sure that the CRL has not been tampered; (vi) based on (v), fail the update process or proceed to (vii); (vii) check that the CRL (or the updated manifest's CRL) does not list the current authentication key (for the HW component's FW) that is included the current manifest; (viii) based on (vii), (a) if it does not, proceed to (x), (b) if it does, proceed to (ix) then (x); (ix) inform the corresponding user by sending a user log (for example, over the network (e.g., 130, FIG. 1)) that specifies the current FW of the HW component is signed with a revoked key, delete recovery FW, and mark the current FW as invalid (so that based on the "invalid" mark/flag, (a) the IHS (200) will not be booted based on the invalid FW and (b) the user will be informed to initiate an out-of-band update to recover the update process); (x) proceed with the FW update process using the FW update file; and (xi) on reboot, use the updated manifest (which includes Key B) to authenticate the updated FW of the HW component.

In one or more embodiments, the boot loader (229) may refer to a boot manager, a boot program, an initial program loader (IPL), or a vendor-proprietary image that has a functionality to, e.g.: (i) load a user's kernel from persistent storage into the main memory of the IHS (200), (ii) perform security checks for one or more HW components of the IHS (200), (iii) guard the device state of one or more HW components of the IHS (200), (iv) boot the IHS (200), (v) ensure that all relevant OS system data and other applications are loaded into the main memory of the IHS (200) (and ready to execute) when the IHS (200) is started. (vi) based on (v), irrevocably transfer control to the operating system (206) and terminate itself, (vii) include any type of executable code for launching or booting a custom BMC FW stack (discussed below) on the BMC (220), (viii) include logic for receiving user input for selecting which operational parameters (discussed below) may be monitored and/or processed by a coprocessor (discussed below), and (ix) include a configuration file that may be edited for selecting (by a user) which operational parameters may be monitored and which operational parameters may be managed by a coprocessor.

In one or more embodiments, the storage/memory resource (226) may be the same type of device as the storage/memory resource (204), or in other embodiments, the storage/memory resource (226) may be a device of a different type.

One of ordinary skill will appreciate that the storage/ memory resource (226) may perform other functionalities without departing from the scope of the invention. When providing its functionalities, the storage/memory resource (226) may perform all, or a portion, of the methods illustrated in FIGS. 3.1 and 3.2. The storage/memory resource (226) may be implemented using HW, SW, or any combination thereof.

In one or more embodiments, as being an out-of-band management network interface (which is separate from and physically isolated from the network interface (212) and/or other embedded resources), the network interface (224) may include one or more systems, apparatuses, or devices that enable the BMC (220) to communicate and/or interface with other devices, services, and components that are located externally to the IHS (200). These devices, services, and components, such as a system management module, may interface with the BMC (220) via an external network (e.g., a management network, a dedicated network, an out-of-band network, etc.), such as the out-of-band connection (232) that provides out-of-band access (e.g., operations performed prior to execution of the BIOS (210) to initialize operation of the IHS (200)).

In one or more embodiments, the network interface (224) may enable the BMC (220) to communicate using any suitable transmission protocol and/or standard. The network interface (224) may include, for example (but not limited to): a network interface card, a 30 gigabit Ethernet network interface, etc. In one or more embodiments, the network interface (224) may be enabled as a LAN-on-motherboard (LOM) card.

In one or more embodiments, the network interface (224) may be the same type of device as the network interface (212), or in other embodiments, the network interface (224) may be a device of a different type.

One of ordinary skill will appreciate that the network interface (224) may perform other functionalities without departing from the scope of the invention. When providing its functionalities, the network interface (224) may perform all, or a portion, of the methods illustrated in FIGS. 3.1-3.3. The network interface (224) may be implemented using HW, SW, or any combination thereof.

In one or more embodiments, the IHS (200) may include one or more additional HW components, not shown for clarity. For example, the IHS (200) may include additional storage devices (that may have or provide functionalities and/or characteristics of the storage or memory resources described above in reference to FIG. 1) for storing machine-executable code (e.g., SW, data, etc.), a platform controller hub (PCH), one or more communications ports for communicating with external devices as well as various I/O devices, one or more power supply units (PSUs), different types of sensors (that report to the BMC (220) about parameters such as temperature, cooling fan speeds, a power status, an OS status, etc.), additional CPUs and bus controllers, a display device, one or more environmental control components (e.g., cooling fans), one or more fan controllers within the BMC (220), an additional processor (e.g., a coprocessor) within the BMC (220), a BMC update module (located, for example, within the processor (222)), and a component FW update module (located, for example, within the processor (208)).

In one or more embodiments, the PCH may be any system, device, or apparatus (e.g., a chipset) configured to (i) control certain data paths (e.g., system buses, data flow, etc.) between at least the processor (208), the storage/memory resource (204), and peripheral devices, and (ii) support certain functions of the processor (208). One such function may include management. The PCH may include HW and/or FW that enables remote in-band and/or out-of-band management for the IHS (200) in order to monitor, maintain, update, upgrade, and/or repair the IHS (200). In one or more embodiments, FW of the PCH may be stored as a part of the BIOS (210) in the storage/memory resource (204).

In one or more embodiments, each peripheral device may be communicatively coupled to the processor (208) and may generally include any information handling resource (e.g., any component system, device, or apparatus of the IHS (200)). Each peripheral device may also be coupled to the processor (222) via, for example, an inter-integrated circuit (I2C) bus and/or a PCIe bus. The processor (222) may communicate directly to peripheral devices via the PCIe bus except for some messages that require a PCIe root complex. For these messages, the PCH may serve as a proxy between the processor (222) and the peripheral devices.

In one or more embodiments, the PSUs may be coupled to the BMC (220) via an I2C bus, in which the BMC (220) may enable remote operation control of the PSUs and other components within the IHS (200). The PSUs may power the HW components of the IHS (200).

In one or more embodiments, a sensor may be, for example, a thermal sensor that is in thermal communication with certain HW components (e.g., the processor (208), the PSUs, etc.) that generate relatively large amounts of heat. As yet another example, a sensor may be a voltage sensor that communicates signals to the BMC (220) associated with an electrical voltage or current at an input line of a PSU, and/or an electrical voltage or current at an output line of a PSU.

In one or more embodiments, the BMC (220) may monitor one or more sensors and send alerts to an administrator of the IHS (200) if any of the parameters do not stay within predetermined limits, indicating a potential failure of the IHS (200). The administrator may also remotely communicate with the BMC (220) to take particular corrective actions, such as resetting or power cycling the IHS (200).

In one or more embodiments, the coprocessor within the BMC (220) may execute a coprocessor FW stack that is stored in a coprocessor memory space (not shown) within the storage/memory resource (226). The coprocessor memory space may be structured to be separate from a BMC memory space (that includes at least the manifests (227), the firmware (228), and the boot loader (229)) so that actions performed by the instructions of the BMC FW stack are not allowed to access and/or do not interfere (inadvertently or maliciously) with the instructions of the coprocessor FW stack. For example, the BMC memory space and the coprocessor memory space may be implemented on a single memory device (e.g., the storage/memory resource (226)), while the instructions of the BMC FW stack are inhibited from accessing data and executable code from the coprocessor memory space using one or more memory access blocking techniques.

Further, the coprocessor may be configured with logic for providing out-of-band monitoring of the custom BMC FW stacks so that, in the event that it causes certain conditions within the IHS (200) to become dangerous for its proper operation, the coprocessor may generate an alert (e.g., a signal, a message, etc.) for remediating the dangerous conditions. The coprocessor may be considered to operate out-of-band with respect to the processor (222) because the actions of the coprocessor function independently or are not controlled by those of the processor (222). Thus, the coprocessor FW stack may provide monitoring capabilities over the processor (222) regardless of what type of logic that is implemented with.

For example, the coprocessor FW stack may monitor certain operational parameters of the IHS (200). Operational parameters generally refer to measured and/or calculated values (e.g., output voltage, current draw, temperature, data throughput, remaining storage capacity, processing rate, memory write rates, memory read rates, etc.) associated with the operation and/or configuration of certain HW components of the host system (202) or the BMC (220). As yet another example, the coprocessor FW stack may communicate with the BIOS (210) to receive HW configuration and/or inventory information associated with the HW components of the IHS (200).

In one or more embodiments, the coprocessor may be configured to continually monitor its executable code to ensure that it is not modified or illicitly accessed by the custom BMC FW stack. For example, the coprocessor may periodically perform a cyclic redundancy check (CRC) operation on its executable code and compare its derived value against previously derived values to determine if any of the code has changed.

In one or more embodiments, the storage/memory resource (204), the processor (208), the BIOS (210), the network interface (212), the processor (222), the storage/memory resource (226), the network interface (224), and the aforementioned additional HW components may be utilized in isolation and/or in combination to provide the above-discussed functionalities. These functionalities may be invoked using any communication model including, for example, message passing, state sharing, memory sharing, etc. By doing so, the IHS (200) may address issues related to data security, integrity, and availability proactively.

Further, some of the above-discussed functionalities may be performed using available resources or when resources of the IHS (200) are not otherwise being consumed. By performing these functionalities when resources are available, these functionalities may not be burdensome on the resources of the IHS (200) and may not interfere with more primary workloads performed by the IHS (200).

Turning now to FIG. 2.2, FIG. 2.2 shows a diagram of the IHS (200) in accordance with one or more embodiments of the invention. In an embodiment of the invention shown in FIG. 2.2 (and similar to the embodiment of the invention shown in FIG. 2.1), the IHS (200) may include (i) the host system (202) that hosts the storage/memory resource (204), the processor (208), the BIOS (210), and the network interface (212); and (ii) the BMC (220) that hosts the storage/memory resource (226), the processor (222), and the network interface (224). The IHS (200) may include additional, fewer, and/or different components without departing from the scope of the invention. Each component may be operably connected to any of the other component via any combination of wired and/or wireless connections. Each component illustrated in FIG. 2.2 is discussed above in reference to FIG. 2.1.

Referring to the embodiment shown in FIG. 2.1, the manifests (227) are stored in a location that is internal to the BMC (220) (as a result of, for example, Step 318 of FIG. 3.1). However, as shown in FIG. 2.2, the manifest (209) may be stored in a location that is external to the BMC (220). For example, as a result of Step 316 of FIG. 3.1, the manifest (209) may be stored in the corresponding HW component (e.g., the BIOS (210)).

FIG. 3.1 shows an HW component's FW update process/method in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Referring to FIG. 3.1, an HW component's FW update process is a common process for each of the HW components of an IHS (e.g., 120A, 120B, etc., FIG. 1). However, depending on the update process (e.g., whether an update package is received out-of-band or in-band, see Steps 314-318), the "signature verification process" or the "authentication process of the HW component's FW" may be performed via "option one" (i.e., the process described in FIG. 3.2) or "option two" (i.e., the process described in FIG. 3.3).

Turning now to FIG. 3.1, the method shown in FIG. 3.1 may be executed by, for example, the BMC update module (if an update package is received via the out-of-band connection (e.g., 232, FIG. 2.1)) or the component FW update module (if an update package is received via the in-band connection (e.g., 230, FIG. 2.1)). Other components of the system (100) illustrated in FIG. 1 may also execute all or part of the method shown in FIG. 3.1 without departing from the scope of the invention.

In Step 300, depending on how an update package (e.g., an ingress payload) is received, the BMC update module or the component FW update module receives the update package for a component (e.g., an HW component such as the BIOS (e.g., 210, FIG. 2.1)) of an IHS (e.g., 120A, 120B, etc., FIG. 1). In one or more embodiments, the update package may include at least a manifest (described above in reference to FIG. 2.1) and an FW update file associated with the component. The update package may be sent by a vendor (e.g., the main vendor that manufactured the IHS or any other trusted third-party components FW vendor) of the vendors (e.g., 140, FIG. 1), in which the vendor has signed the FW update file for authentication.

In Step 302, depending on how the update package is received, the BMC update module or the component FW update module analyzes the update package to extract at least the manifest (which is signed by the vendor for authentication) and the FW update file. The corresponding module may then send the manifest and FW update file to the processor (e.g., 222, FIG. 2.1) of the BMC (e.g., 220, FIG. 2.1) via, for example, a side-band channel (e.g., a shared memory access (SMA) channel, a keyboard controller style (KCS) channel, etc.).

In Step 304, upon receiving the manifest, the processor of the BMC makes a first determination (for example, using a manifest verification key that is already stored in the storage/memory resource (e.g., 226, FIG. 2.1) of the BMC) as to whether the manifest is authenticated/valid (e.g., the signature of the manifest is authenticated/valid). Accordingly, in one or more embodiments, if the result of the determination is NO, the method proceeds to Step 306. If the result of the determination is YES, the method alternatively proceeds to Step 310.

In Step 306, (a) as a result of the first determination in Step 304 being NO or (b) as a result of a second determination in Step 310 being NO, the processor of the BMC blocks (e.g., halts, disables, etc.) an FW update process/operation of the component and tags the manifest as an invalid manifest (so that (i) unauthorized entities cannot access to the business-critical data within the IHS, (ii) unauthorized entities cannot manipulate internal/external operations (e.g., updating FW(s) of the components of the IHS) performed by the IHS, and (iii) the FW update process of the component FW may not be initiated unless and until the processor of the BMC validates the manifest).

In Step 308, the processor of the BMC initiates a security policy for the manifest (and/or for the IHS) and generates a user log (e.g., an error message) that specifies the manifest is an invalid manifest and/or the key revocation criteria could not be met. The processor of the BMC may then send the user log and its corresponding details to the processor (e.g., 208, FIG. 2.1) of the host system (e.g., 208, FIG. 2.1). The processor of the host system may then store (temporality or permanently) the aforementioned information in the storage/memory resource (e.g., 204, FIG. 2.1) of the host system.

Thereafter, based on the initiated security policy, the processor of the BMC may, e.g.: (i) disable a hidden root key of the BMC, (ii) make sure that tamper proof sensitive data residing on the host system and/or the BMC cannot be accessed (thus, the data may only be access by a secure booted FW, such that programmers cannot access the data), (iii) disable a secure boot operation of the IHS, (iv) execute a full stop of operations within IHS. (v) generate one or more error indications (e.g., displaying a message (to a user or an administrator) on a display engine, sending a message over a serial connector, sending network alerts (e.g., a simple network management protocol (SNMP) trap), causing a light to flash on the IHS, (vi) inform a user or an administrator about the user log and its corresponding details (using, for example, a network (e.g., 130, FIG. 1) and a network interface (e.g., 212, 224, FIG. 2.1)), (vii) delete the manifest and the FW update file, and (viii) send a fake response (or a fake notification) to the malicious entity (that sent the update package) indicating that the update process has been completed successfully.

In one or more embodiments, the method may end following Step 308.

In Step 310, as a result of the first determination in Step 304 being YES, the processor of the BMC makes the second determination as to whether key revocation criteria are met. Accordingly, in one or more embodiments, if the result of the determination is NO, the method proceeds to Step 306. If the result of the determination is YES, the method alternatively proceeds to Step 312.

In one or more embodiments, the key revocation criteria may specify, e.g.: (i) the manifest should not use an authentication key (for the component's FW) that is listed in a CRL (included in the manifest) (said another way, the CRL should not list (e.g., include) an authentication key to be used to authenticate an updated FW of the component) and (ii) the CRL should not list the current authentication key (for the component's FW) that is included the current manifest. Further, the processor of the BMC may verify/validate the CRL based on the X509 CRL validity standard to make sure that the CRL has not been tampered.

In Step 312, as a result of the second determination in Step 310 being YES, the processor of the BMC updates (e.g., flashes) the FW of the component using the FW update file, in which, after being updated, the component has the updated FW.

In Step 314, the processor of the BMC makes a third determination as to whether the update package is received via the out-of-band connection. Accordingly, in one or more embodiments, if the result of the determination is NO, the method proceeds to Step 316. If the result of the determination is YES, the method alternatively proceeds to Step 318.

In some cases (e.g., technical support cases, internal development cases, cases where a different way of updating the FW of the component is used other than in-band connection-based update process or out-of-band connection-based update process, etc.), a trusted programmer (e.g., an administrator, a trusted member of a development team, etc.) may directly writes ((a) without using the out-of-band connection or the in-band connection, and (b) using one or more trusted external programming devices) the "trusted/valid" update package into the corresponding component's storage/memory resource (so that the FW of the component may be directly updated using the FW update file).

In Step 316, as a result of the third determination in Step 314 being NO, the processor of the BMC stores the manifest in a storage/memory resource of the component (so that the manifest (and the authentication key) will reside within the component and will be accessible to the processor of the BMC at a later point-in-time). Thereafter, the processor of the BMC initiates notification of the user of the IHS about the updated FW of the component and completion of the update process of the component.

In one or more embodiments, the notification may indicate whether the update process was completed within the predetermined window, or whether the update process was completed after exceeding the predetermined window. The notification may be displayed on the GUI of the IHS.

In one or more embodiments, the method may end following Step 316.

In Step 318, as a result of the third determination in Step 314 being YES, the processor of the BMC stores the manifest in the storage/memory resource of the BMC (so that the manifest (and the authentication key) will reside, for example, within the manifests (e.g., 227, FIG. 2.1) and will be accessible to the processor of the BMC at a later point-in-time). Thereafter, the processor of the BMC initiates notification of the user of the IHS about the updated FW of the component and completion of the update process of the component.

In one or more embodiments, the notification may indicate whether the update process was completed within the predetermined window, or whether the update process was completed after exceeding the predetermined window. The notification may be displayed on the GUI of the IHS.

In one or more embodiments, the method may end following Step 318.

FIG. 3.2 shows an ROT sequence/method (e.g., the authentication process of the component's FW upon powering on the IHS) after an out-of-band component FW update in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Referring to FIG. 3.2, the signature verification process or the authentication process of the HW component's FW is performed as "option one".

Turning now to FIG. 3.2, the method (e.g., "option one") shown in FIG. 3.2 may be executed by, for example, the above-discussed processor of the BMC. Other components of the system (100) illustrated in FIG. 1 may also execute all or part of the method shown in FIG. 3.2 without departing from the scope of the invention.

In Step 320, at a later point-in-time (e.g., after an out-of-band component FW update has been completed and after the user is notified), the processor of the BMC detects that the IHS (i.e., the IHS in which the BMC is located) is powered on by the user (via, for example, an AC or DC event). This detection may trigger the processor of the BMC to perform the following steps (e.g., when power is first applied to the IHS, the processor of the BMC starts a sequence of initialization procedures (e.g., the ROT sequence)).

For example, an AC event may refer to coupling or "plugging in" the IHS to a power source (e.g., a power supply). As yet another example, a DC event refer to an interaction by the user (or other stimulus) indicating a desire to enable a main power supply and execute the host system of the IHS.

In Step 322, the processor of the BMC obtains (for example, via a daemon of the processor) component's FW from the component. More specifically, the processor of the BMC obtains the updated FW (see Step 312 of FIG. 3.1) from the component.

In Step 324, the processor of the BMC obtains (for example, via the daemon) the manifest from the storage/memory resource of the BMC (as discussed above in reference to Step 318 of FIG. 3.1, the manifest was stored in the storage/memory resource of the BMC). More specifically, the processor of the BMC may obtain the manifest (which includes the authentication key to authenticate the updated FW of the component) from the "manifests" section/portion under the storage/memory resource of the BMC.

As described above in reference to FIG. 1, the manifest may be signed (or otherwise secured by the corresponding vendor) using a private key for authentication. Similarly, the FW of the component (more specifically, the updated FW of the component) may be signed (or otherwise secured by the corresponding vendor) using a private key pair of the authentication key for authentication.

In Step 326, upon obtaining the manifest, the processor of the BMC makes a first determination (for example, using a manifest verification key that is already stored in the storage/memory resource of the BMC) as to whether the manifest is authenticated/valid and the key revocation criteria (described above in reference to Step 310 of FIG. 3.1) are met. Accordingly, in one or more embodiments, if the result of the determination is NO, the method proceeds to Step 328. If the result of the determination is YES, the method alternatively proceeds to Step 332.

As indicated, in Step 326, an additional layer of verification is applied, in which rather than directly verifying the signature of the component's FW, the processor of the BMC first verifies the validity of the signature of the manifest. Thereafter, using the authentication key included in the manifest, the processor of the BMC verifies the validity of the signature of the component's FW. In this manner, using the manifest provides the flexibility of updating/changing the authentication key of the component's FW with just a component FW update (while earlier BMC infrastructures would require an FW update to the BMC's FW as well to bring a newer authentication key).

In Step 328, (a) as a result of the first determination in Step 326 being NO, (b) as a result of a second determination in Step 332 being NO, or (c) as a result of a third determination in Step 334 being NO, the processor of the BMC blocks a (secure) boot operation/process of the IHS and tags the manifest as an invalid manifest (so that (i) unauthorized entities cannot access to the business-critical data within the IHS, (ii) unauthorized entities cannot manipulate internal/external operations performed by the IHS, and (iii) the IHS may not be booted unless and until the processor of the BMC validates the manifest and the component's FW, and infers that the key revocation criteria are met).

In Step 330, the processor of the BMC initiates a security policy for the manifest (and/or for the IHS) and generates a user log that specifies the manifest is an invalid manifest, the signature verification of the component's FW is failed, and/or the component's FW is not suitable/valid for the IHS. The processor of the BMC may then send the user log and its corresponding details to the processor of the host system. The processor of the host system may then store (temporality or permanently) the aforementioned information in the storage/memory resource of the host system.

Thereafter, based on the initiated security policy, the processor of the BMC may, e.g.: (i) disable a hidden root key of the BMC, (ii) make sure that tamper proof sensitive data residing on the host system and/or the BMC cannot be accessed (thus, the data may only be access by a secure booted FW, such that programmers cannot access the data), (iii) execute a full stop of operations within IHS, (iv) generate one or more error indications (e.g., displaying a message (to the user or an administrator) on a display engine, sending a message over a serial connector, sending network alerts (e.g., an SNMP trap), causing a light to flash on the IHS), (v) inform the user or an administrator about the user log and its corresponding details (using, for example, the network and a network interface), (vi) delete the manifest, (vii) initiate a component FW recovery operation by notifying the user (or an administrator) so that the user may manually update the FW of the component with a valid FW obtained/downloaded from, for example, the corresponding vendor's database (the operation discussed herein may be an automated operation as well), (viii) initiate a component FW recovery operation by notifying the user (because the IHS does not support the component's FW (which means the component's FW is invalid), see Step 334) so that the user may manually find a compatible FW for the IHS from, for example, the corresponding vendor's database in order to bring the component's FW into a required state (e.g., a healthy state) (the operation discussed herein may be an automated operation as well), and (viii) send a fake response (or a fake notification) to the malicious entity (that wanted to boot the IHS) indicating that the IHS has been booted successfully.

In one or more embodiments, the method may end following Step 330.

In Step 332, as a result of the first determination in Step 326 being YES, the processor of the BMC makes the second determination as to whether the component's FW is authenticated/valid (via a signature authentication process). Accordingly, in one or more embodiments, if the result of the determination is NO, the method proceeds to Step 328. If the result of the determination is YES, the method alternatively proceeds to Step 334.

In one or more embodiments, the processor of the BMC may perform the second determination using the authentication key included in the manifest. Based on the authentication key, the processor of the BMC verifies the validity of the signature of the component's FW (which is signed (by the corresponding vendor) with a private key pair of the authentication key).

In Step 334, as a result of the second determination in Step 332 being YES, the processor of the BMC makes the third determination as to whether the component's FW (e.g., the updated FW of the component) is valid/compatible to be executed on the IHS. Accordingly, in one or more embodiments, if the result of the determination is NO, the method proceeds to Step 328. If the result of the determination is YES, the method alternatively proceeds to Step 336.

In one or more embodiments, the IHS may be a data center including multiple server racks and each server rack includes multiple servers, such as data storage servers. However, one of ordinary skill in the art would recognize that the operations described herein may be applied to a modular chassis system with multiple servers/sleds without departing from the scope of the disclosure. Further, due to the changing uses of IHSs, the components that generate the IHSs have become modular. While this allows IHSs to be customized to support a larger number of use cases, the manufacturers of components for IHSs have found it challenging to ensure that their components are utilized in the manner in which they were intended to be used.

For at least the reasons discussed above. (a) after performing signature verification of the component's FW (performed in Step 332) and (b) before initiating the booting process of the IHS, the processor of the BMC may need to make sure that the component's FW is compatible/functional for the IHS and the component may operate/communicate with other components of the IHS without having any issues (otherwise, catastrophic failures may occur within the IHS upon booting the IHS (e.g., unavailability of the IHS)). To this end, the processor of the BMC may (i) obtain (or receive) a type of the IHS from an authenticated source (e.g., a complex programmable logic device (CPLD), the storage/ memory resource of the BMC, a controller chip, etc.) and (ii) analyze/read the "supported IHSs" section of the manifest. Based on the information inferred from (i) and (ii), the processor of the BMC determines which IHSs (or what type of IHSs) are compatible/suitable/supported for the component's FW.

In Step 336, as a result of the third determination in Step 334 being YES (indicating the component's FW is verified and it is compatible for the IHS), the processor of the BMC initiates (or allows) the (secure) booting process of the IHS (so that the IHS will be ready to interact with the user (e.g., the IHS will be enabled for operation, device drivers will be installed, OS data will be loaded into the main memory of the IHS (200), etc.) (or the OS will be capable of executing system applications) when the booting process is completed.

In one or more embodiments, the method may end following Step 336.

FIG. 3.3 shows an ROT sequence/method (e.g., the authentication process of the component's FW upon powering on the IHS) after an in-band component FW update in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Referring to FIG. 3.3, the signature verification process or the authentication process of the component's FW is performed as "option two".

Turning now to FIG. 3.3, the method (e.g., "option two") shown in FIG. 3.3 may be executed by, for example, the above-discussed processor of the BMC. Other components of the system (100) illustrated in FIG. 1 may also execute all or part of the method shown in FIG. 3.3 without departing from the scope of the invention.

In Step 338, at a later point-in-time (e.g., after an in-band component FW update has been completed and after the user is notified), the processor of the BMC detects that the IHS is powered on by the user (via, for example, an AC or DC event). This detection may trigger the processor of the BMC to perform the following steps (e.g., when power is first applied to the IHS, the processor of the BMC may start a sequence of initialization procedures (e.g., the ROT sequence)).

For example, an AC event may refer to coupling or "plugging in" the IHS to a power source. As yet another example, a DC event refer to an interaction by the user (or other stimulus) indicating a desire to enable a main power supply and execute the host system of the IHS.

In Step 340, the processor of the BMC obtains (for example, via a daemon of the processor) component's FW from the component. More specifically, the processor of the BMC obtains the updated FW (see Step 312 of FIG. 3.1) from the component.

In Step 342, the processor of the BMC obtains (for example, via the daemon) the manifest from the storage/ memory resource of the component (as discussed above in reference to Step 316 of FIG. 3.1, the manifest was stored in the storage/memory resource of the component). For example, referring to FIG. 2.2, the processor of the BMC may obtain the manifest (which includes the authentication key to authenticate the updated FW of the component) from the manifest (e.g., 209, FIG. 2.2) section/portion under the storage/memory resource of the BIOS via a side-band channel (e.g., the SMA channel, the KCS channel, etc.).

As described above in reference to FIG. 1, the manifest may be signed (or otherwise secured by the corresponding vendor) using a private key for authentication. Similarly, the FW of the component (more specifically, the updated FW of the component) may be signed (or otherwise secured by the corresponding vendor) using a private key pair of the authentication key for authentication.

In Step 344, upon obtaining the manifest, the processor of the BMC makes a first determination (for example, using a manifest verification key that is already stored in the storage/ memory resource of the BMC) as to whether the manifest is authenticated/valid and the key revocation criteria (described above in reference to Step 310 of FIG. 3.1) are met. Accordingly, in one or more embodiments, if the result of the determination is NO, the method proceeds to Step 346. If the result of the determination is YES, the method alternatively proceeds to Step 350.

As indicated, in Step 344, an additional layer of verification is applied, in which rather than directly verifying the signature of the component's FW, the processor of the BMC first verifies the validity of the signature of the manifest. Thereafter, using the authentication key included in the manifest, the processor of the BMC verifies the validity of the signature of the component's FW. In this manner, using the manifest provides the flexibility of updating/changing the authentication key of the component's FW with just a component FW update (while earlier BMC infrastructures would require an FW update to the BMC's FW as well to bring a newer authentication key).

In Step 346. (a) as a result of the first determination in Step 344 being NO or (b) as a result of a second determination in Step 350 being NO, or (c) as a result of a third determination in Step 352 being NO, the processor of the BMC blocks a (secure) boot operation/process of the IHS and tags the manifest as an invalid manifest (so that (i) unauthorized entities cannot access to the business-critical data within the IHS, (ii) unauthorized entities cannot manipulate internal/external operations performed by the IHS, and (iii) the IHS may not be booted unless and until the processor of the BMC validates the manifest and the component's FW, and infers that the key revocation criteria are met).

In Step 348, the processor of the BMC initiates a security policy for the manifest (and/or for the IHS) and generates a user log that specifies the manifest is an invalid manifest, the signature verification of the component's FW is failed, and/or the component's FW is not suitable/valid for the IHS. The processor of the BMC may then send the user log and its corresponding details to the processor of the host system. The processor of the host system may then store (temporality or permanently) the aforementioned information in the storage/memory resource of the host system.

Thereafter, based on the initiated security policy, the processor of the BMC may, e.g.: (i) disable a hidden root key of the BMC, (ii) make sure that tamper proof sensitive data residing on the host system and/or the BMC cannot be accessed (thus, the data may only be access by a secure booted FW, such that programmers cannot access the data), (iii) execute a full stop of operations within IHS, (iv) generate one or more error indications (e.g., displaying a message (to the user or an administrator) on a display engine, sending a message over a serial connector, sending network alerts (e.g., an SNMP trap), causing a light to flash on the IHS), (v) inform the user or an administrator about the user log and its corresponding details (using, for example, the network and a network interface), (vi) delete the manifest, (vii) initiate a component FW recovery operation by notifying the user (or an administrator) so that the user may manually update the FW of the component with a valid FW obtained/downloaded from, for example, the corresponding vendor's database (the operation discussed herein may be an automated operation as well), (viii) initiate a component FW recovery operation by notifying the user (because the IHS does not support the component's FW (which means the component's FW is invalid), see Step 352) so that the user may manually find a compatible FW for the IHS from, for example, the corresponding vendor's database in order to bring the component's FW into a required state (the operation discussed herein may be an automated operation as well), and (viii) send a fake response (or a fake notification) to the malicious entity (that wanted to boot the IHS) indicating that the IHS has been booted successfully.

In one or more embodiments, the method may end following Step 348.

In Step 350, as a result of the first determination in Step 344 being YES, the processor of the BMC makes the second determination as to whether the component's FW is authenticated/valid (via a signature authentication process). Accordingly, in one or more embodiments, if the result of the determination is NO, the method proceeds to Step 346. If the result of the determination is YES, the method alternatively proceeds to Step 352.

In one or more embodiments, the processor of the BMC may perform the second determination using the authentication key included in the manifest. Based on the authentication key, the processor of the BMC verifies the validity of the signature of the component's FW (which is signed (by the corresponding vendor) with a private key pair of the authentication key).

In Step 352, as a result of the second determination in Step 350 being YES, the processor of the BMC makes the third determination as to whether the component's FW (e.g., the updated FW of the component) is valid/compatible to be executed on the IHS. Accordingly, in one or more embodiments, if the result of the determination is NO, the method proceeds to Step 346. If the result of the determination is YES, the method alternatively proceeds to Step 354.

In one or more embodiments, the processor of the BMC may perform the second determination using the authentication key included in the manifest. Based on the authentication key, the processor of the BMC verifies the validity of the signature of the component's FW (which is signed (by the corresponding vendor) with a private key pair of the authentication key).

In one or more embodiments, the IHS may be a data center including multiple server racks and each server rack includes multiple servers, such as data storage servers. However, one of ordinary skill in the art would recognize that the operations described herein may be applied to a modular chassis system with multiple servers/sleds without departing from the scope of the disclosure. Further, due to the changing uses of IHSs, the components that generate the IHSs have become modular. While this allows IHSs to be customized to support a larger number of use cases, the manufacturers of components for IHSs have found it challenging to ensure that their components are utilized in the manner in which they were intended to be used.

For at least the reasons discussed above, (a) after signature verification of the component's FW (performed in Step 350) and (b) before initiating the booting process of the IHS, the processor of the BMC may need to make sure that the component's FW is compatible/functional for the IHS and the component may operate/communicate with other components of the IHS without having any issues (otherwise, catastrophic failures may occur within the IHS upon booting the IHS (e.g., unavailability of the IHS)). To this end, the processor of the BMC may (i) obtain (or receive) a type of the IHS from an authenticated source (e.g., a CPLD, the storage/memory resource of the BMC, a controller chip, etc.) and (ii) analyze/read the "supported IHSs" section of the manifest. Based on the information inferred from (i) and (ii), the processor of the BMC determines which IHSs (or what type of IHSs) are compatible/suitable/supported for the component's FW.

In Step 354, as a result of the third determination in Step 352 being YES (indicating the component's FW is verified and it is compatible for the IHS), the processor of the BMC initiates (or allows) the (secure) booting process of the IHS (so that the IHS will be ready to interact with the user (e.g., the IHS will be enabled for operation, device drivers will be installed, OS data will be loaded into the main memory of the IHS (200), etc.) (or the OS will be capable of executing system applications) when the booting process is completed.

In one or more embodiments, the method may end following Step 354.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for securely updating a firmware (FW) of a hardware (HW) component of an information handling system (IHS), the method comprising:

receiving an update package for the HW component, wherein the update package is received via an out-of-band connection;

analyzing the update package to extract at least a manifest and an FW update file associated with the HW component, wherein the FW update file is signed by a vendor for authentication;

making, using a manifest verification key, a first determination that the manifest is authenticated, wherein the manifest is signed by the vendor for authentication;

making, based on the first determination, a second determination that a key revocation criterion is met, wherein the key revocation criterion specifies that a certificate revocation list (CRL) does not specify an authentication key to be used to authenticate an updated FW of the HW component, wherein the CRL is verified to assure that the CRL has not been tampered with;

updating, based on the second determination, the FW of the HW component using the FW update file, wherein, after being updated, the HW component has the updated FW;

making, based on the updating, a third determination that the update package is received via the out-of-band connection;

storing, based on the third determination, the manifest to a baseboard management controller (BMC);

initiating notification of a user of the IHS about the updated FW of the HW component, wherein the notification specifies that updating the FW of the HW component has been completed after exceeding a predetermined window;

after the notification of the user and after the IHS being powered on by the user:

obtaining the updated FW of the HW component;

obtaining the manifest from a memory device;

making a fourth determination that the manifest is not authenticated and the key revocation criterion is not met;

blocking, based on the fourth determination, a secure boot operation of the IHS and tagging the manifest as invalid; and initiating a security policy for the manifest, wherein the security policy comprises disabling a hidden root key of the BMC.

2. The method of claim 1, further comprising:

receiving a second update package for a second HW component of the IHS, wherein the second update package is received via a second out-of-band connection, wherein the second HW component comprises a second FW;

analyzing the second update package to extract at least a second manifest and a second FW update file associated with the second HW component, wherein the second FW update file is signed by a second vendor for authentication;

making, using a second manifest verification key, a fifth determination that the second manifest is authenticated, wherein the second manifest is signed by the second vendor for authentication;

making, based on the fifth determination, a sixth determination that a second key revocation criterion is met, wherein the second key revocation criterion specifies that a second certificate revocation list (CRL) does not specify a second authentication key to be used to authenticate a second updated FW of the second HW component, wherein the second CRL is verified to assure that the second CRL has not been tampered with;

updating, based on the sixth determination, the second FW of the second HW component using the second FW update file, wherein, after being updated, the second HW component has the second updated FW;

making, based on the updating, a seventh determination that the second update package is received via the second out-of-band connection;

storing, based on the seventh determination, the second manifest to a second baseboard management controller (BMC);

initiating a second notification of a second user of the IHS about the second updated FW of the second HW component, wherein the second notification specifies that updating the second FW of the second HW component has been completed after exceeding a second predetermined window; and after the second notification of the second user and after the IHS being powered on by the second user:

obtaining the second updated FW of the second HW component;

obtaining the second manifest from a second memory device;

making an eighth determination that the second manifest is authenticated and the second key revocation criterion is met;

making, based on the eighth determination, a ninth determination that the second updated FW is authenticated, wherein the ninth determination is made using the second authentication key included in the second manifest;

making, based on the ninth determination, a tenth determination that the second updated FW is compatible to be executed on the IHS; and booting, based on the tenth determination, the IHS.

3. The method of claim 1, wherein the memory device is located on a management controller (MC).

4. The method of claim 3, wherein the MC is the BMC and wherein the BMC comprises a network interface for the out-of-band connection.

5. The method of claim 1, wherein the vendor used a private key to sign the FW update file, wherein the private key and the authentication key are key pairs, and wherein the vendor keeps the private key in a vault external to the IHS.

6. The method of claim 1, wherein the HW component is a basic input/output system (BIOS) device.

7. The method of claim 6, wherein the BIOS device is located on a host system and external to the BMC.

8. The method of claim 1, wherein the manifest comprises at least one selected from a group consisting of the authentication key, the CRL, a feature associated with the HW component, a model number of a supported IHS, and a communication protocol that needs to be used to communicate with the HW component.

9. An information handling system (IHS), comprising:

a host system comprising a hardware (HW) component and external to a management controller (MC); and the MC comprising a processor and a memory device, wherein the memory device comprises instructions, which when executed by the processor enables the processor to perform a method for securely updating a firmware (FW) of the HW component, the method comprising:

receiving an update package for the HW component, wherein the update package is received via an out-of-band connection;

analyzing the update package to extract at least a manifest and an FW update file associated with the HW component, wherein the FW update file is signed by a vendor for authentication;

making, using a manifest verification key, a first determination that the manifest is authenticated, wherein the manifest is signed by the vendor for authentication;

making, based on the first determination, a second determination that a key revocation criterion is met, wherein the key revocation criterion specifies that a certificate revocation list (CRL) does not specify an authentication key to be used to authenticate an updated FW of the HW component, wherein the CRL is verified to assure that the CRL has not been tampered with;

updating, based on the second determination, the FW of the HW component using the FW update file, wherein, after being updated, the HW component has the updated FW;

making, based on the updating, a third determination that the update package is received via the out-of-band connection;

storing, based on the third determination, the manifest to a baseboard management controller (BMC);

initiating notification of a user of the IHS about the updated FW of the HW component, wherein the notification specifies that updating the FW of the HW component has been completed after exceeding a predetermined window;

after the notification of the user and after the IHS being powered on by the user:

obtaining the updated FW of the HW component;

obtaining the manifest from the memory device;

making a fourth determination that the manifest is not authenticated and the key revocation criterion is not met;

blocking, based on the fourth determination, a secure boot operation of the IHS and tagging the manifest as invalid; and initiating a security policy for the manifest, wherein the security policy comprises disabling a hidden root key of the BMC.

10. The IHS of claim 9, wherein the vendor used a private key to sign the FW update file, wherein the private key and the authentication key are key pairs, and wherein the vendor keeps the private key in a vault external to the IHS.

11. The IHS of claim 9, wherein the method further comprising:

receiving a second update package for a second HW component of the IHS, wherein the second update package is received via a second out-of-band connection, wherein the second HW component comprises a second FW;

analyzing the second update package to extract at least a second manifest and a second FW update file associated with the second HW component, wherein the second FW update file is signed by a second vendor for authentication;

making, using a second manifest verification key, a fifth determination that the second manifest is authenticated, wherein the second manifest is signed by the second vendor for authentication;

making, based on the fifth determination, a sixth determination that a second key revocation criterion is met, wherein the second key revocation criterion specifies that a second certificate revocation list (CRL) does not specify a second authentication key to be used to authenticate a second updated FW of the second HW component, wherein the second CRL is verified to assure that the second CRL has not been tampered with;

updating, based on the sixth determination, the second FW of the second HW component using the second FW update file, wherein, after being updated, the second HW component has the second updated FW;

making, based on the updating, a seventh determination that the second update package is received via the second out-of-band connection;

storing, based on the seventh determination, the second manifest to a second baseboard management controller (BMC);

initiating a second notification of a second user of the IHS about the second updated FW of the second HW component, wherein the second notification specifies that updating the second FW of the second HW component has been completed after exceeding a second predetermined window; and after the second notification of the second user and after the IHS being powered on by the second user:

obtaining the second updated FW of the second HW component;

obtaining the second manifest from a second memory device;

making an eighth determination that the second manifest is authenticated and the second key revocation criterion is met;

making, based on the eighth determination, a ninth determination that the second updated FW is authenticated, wherein the ninth determination is made using the second authentication key included in the second manifest;

making, based on the ninth determination, a tenth determination that the second updated FW is compatible to be executed on the IHS; and booting, based on the tenth determination, the IHS.

12. The IHS of claim 11, wherein, upon booting the IHS, a third FW loads operating system data into a second memory device of the host system.

13. The IHS of claim 9, wherein the MC is the BMC and wherein the BMC comprises a network interface for the out-of-band connection.

14. The IHS of claim 9, wherein the HW component is a basic input/output system (BIOS) device.

15. The IHS of claim 9, wherein the manifest comprises at least one selected from a group consisting of the authentication key, the CRL, a feature associated with the HW component, a model number of a supported IHS, and a communication protocol that needs to be used to communicate with the HW component.

16. An information handling system (IHS), comprising:

a management controller (MC) external to a host system; and the host system comprising a hardware (HW) component, a processor, and a memory device, wherein the memory device comprises instructions, which when executed by the processor enables the processor to perform a method for securely updating a firmware (FW) of the HW component, the method comprising:

receiving an update package for the HW component, wherein the update package is received via an in-band connection;

analyzing the update package to extract at least a manifest and an FW update file associated with the HW component, wherein the FW update file is signed by a vendor for authentication;

making, using a manifest verification key, a first determination that the manifest is authenticated, wherein the manifest is signed by the vendor for authentication;

making, based on the first determination, a second determination that a key revocation criterion is met, wherein the key revocation criterion specifies that a certificate revocation list (CRL) does not specify an authentication key to be used to authenticate an updated FW of the HW component, wherein the CRL is verified to assure that the CRL has not been tampered with;

updating, based on the second determination, the FW of the HW component using the FW update file, wherein, after being updated, the HW component has the updated FW;

making, based on the updating, a third determination that the update package is not received via the out-of-band connection;

storing, based on the third determination, the manifest to the memory device; and initiating notification of a user of the IHS about the updated FW of the HW component, wherein the notification specifies that updating the FW of the HW component has been completed after exceeding a predetermined window;

after the notification of the user and after the IHS being powered on by the user:

obtaining the updated FW of the HW component;

obtaining the manifest from the memory device;

making a fourth determination that the manifest is not authenticated and the key revocation criterion is not met;

blocking, based on the fourth determination, a secure boot operation of the IHS and tagging the manifest as invalid; and initiating a security policy for the manifest, wherein the security policy comprises disabling a hidden root key of the BMC.

17. The IHS of claim 16, wherein the method further comprising:

receiving a second update package for a second HW component of the IHS, wherein the second update package is received via a second out-of-band connection, wherein the second HW component comprises a second FW;

analyzing the second update package to extract at least a second manifest and a second FW update file associated with the second HW component, wherein the second FW update file is signed by a second vendor for authentication;

making, using a second manifest verification key, a fifth determination that the second manifest is authenticated, wherein the second manifest is signed by the second vendor for authentication;

making, based on the fifth determination, a sixth determination that a second key revocation criterion is met, wherein the second key revocation criterion specifies that a second certificate revocation list (CRL) does not specify a second authentication key to be used to authenticate a second updated FW of the second HW component, wherein the second CRL is verified to assure that the second CRL has not been tampered with;

updating, based on the sixth determination, the second FW of the second HW component using the second FW update file, wherein, after being updated, the second HW component has the second updated FW;

making, based on the updating, a seventh determination that the second update package is received via the second out-of-band connection;

storing, based on the seventh determination, the second manifest to a second baseboard management controller (BMC);

initiating a second notification of a second user of the IHS about the second updated FW of the second HW component, wherein the second notification specifies that updating the second FW of the second HW component has been completed after exceeding a second predetermined window; and after the second notification of the second user and after the IHS being powered on by the second user:

obtaining the second updated FW of the second HW component;

obtaining the second manifest from a second memory device;

making an eighth determination that the second manifest is authenticated and the second key revocation criterion is met;

making, based on the eighth determination, a ninth determination that the second updated FW is authenticated, wherein the ninth determination is made using the second authentication key included in the second manifest;

making, based on the ninth determination, a tenth determination that the second updated FW is compatible to be executed on the IHS; and booting, based on the tenth determination, the IHS.

18. The IHS of claim 16, wherein the manifest comprises at least one selected from a group consisting of the authentication key, the CRL, a feature associated with the HW component, a model number of a supported IHS, and a communication protocol that needs to be used to communicate with the HW component.

19. The IHS of claim 16, wherein the vendor used a private key to sign the FW update file, wherein the private key and the authentication key are key pairs, and wherein the vendor keeps the private key in a vault external to the IHS.

\* \* \* \* \*